United States Patent
Sánchez Dolado et al.

(10) Patent No.: US 10,968,108 B2
(45) Date of Patent: Apr. 6, 2021

(54) METHOD FOR THE MANUFACTURE OF CALCIUM SILICATE HYDRATE USED AS HARDENING ACCELERATOR IN CONCRETE AND CEMENT-BASED MATERIALS, CALCIUM SILICATE HYDRATE MANUFACTURED WITH SAID METHOD

(71) Applicant: FUNDACION TECNALIA RESEARCH & INNOVATION, Donostia—San Sebastian (ES)

(72) Inventors: Jorge Sánchez Dolado, Donostia—San Sebastian (ES); Juan José Gaitero Redondo, Donostia—San Sebastian (ES)

(73) Assignee: FUNDACION TECNALIA RESEARCH & INNOVATION, San Sebastián (ES)

( * ) Notice: Subject to any disclaimer, the term of this patent is extended or adjusted under 35 U.S.C. 154(b) by 662 days.

(21) Appl. No.: 15/577,268

(22) PCT Filed: May 29, 2015

(86) PCT No.: PCT/EP2015/061923
§ 371 (c)(1),
(2) Date: Nov. 27, 2017

(87) PCT Pub. No.: WO2016/192745
PCT Pub. Date: Dec. 8, 2016

(65) Prior Publication Data
US 2018/0148340 A1    May 31, 2018

(51) Int. Cl.
*C01B 33/24* (2006.01)
*C04B 22/00* (2006.01)
(Continued)

(52) U.S. Cl.
CPC ............ *C01B 33/24* (2013.01); *C04B 14/043* (2013.01); *C04B 22/0086* (2013.01);
(Continued)

(58) Field of Classification Search
CPC ... C01B 33/24; C04B 14/043; C04B 22/0086; C04B 40/0042; Y02W 30/91; C01P 2002/72
See application file for complete search history.

(56) References Cited

U.S. PATENT DOCUMENTS 4,126,003 A * 11/1978 Tomic .................. C04B 28/065
                                                            106/724
4,454,048 A *  6/1984 Brunbeck ................. C02F 1/52
                                                            210/726
(Continued)

FOREIGN PATENT DOCUMENTS

EP    2878585 A1    6/2015
RU    2185713 C2    7/2002
(Continued)

OTHER PUBLICATIONS

International Search Report and Written Opinion dated Feb. 17, 2016 for PCT/EP2015/061923, 16 pages.
(Continued)

*Primary Examiner* — Pegah Parvini
(74) *Attorney, Agent, or Firm* — Squire Patton Boggs (US) LLP

(57) ABSTRACT

A process for the manufacturing of a slurry containing nucleating agents which comprises reacting at least one source of a Ca containing compound with at least one source of a Si containing compound, in an aqueous media and in the presence of a doping agent selected from the group consisting of P, B, S, and mixtures thereof; wherein: (i) the reaction is carried out at a temperature comprised from 100 to 350°
(Continued)

C.; (ii) the total molar ratio Ca/Si is 1.5-2.5, and (iii) the total molar ratio doping agent/Si is 0.01-2; provided that: (a) when the sole doping agent is P, the total molar ratio P/Si is 0.1-2; (b) when the sole doping agent is B, the total molar ratio B/Si is 0.01-2, and (c) when the sole doping agent is S, the total molar ratio S/Si is 0.1-2.

22 Claims, 11 Drawing Sheets

(51) Int. Cl.
    C04B 14/04    (2006.01)
    C04B 40/00    (2006.01)
    C04B 40/02    (2006.01)
(52) U.S. Cl.
    CPC ........ C04B 40/0042 (2013.01); C04B 40/024 (2013.01); *C01P 2002/72* (2013.01); *Y02W 30/91* (2015.05)

(56) References Cited

U.S. PATENT DOCUMENTS

| | | | | |
|---|---|---|---|---|
| 5,211,750 | A * | 5/1993 | Smith | B09B 1/00 106/710 |
| 6,726,807 | B1 * | 4/2004 | Mathur | D21H 21/285 162/181.6 |
| 2011/0041737 | A1 | 2/2011 | Beuchle et al. | |
| 2012/0024196 | A1 * | 2/2012 | Gong | C04B 28/006 106/694 |
| 2015/0197448 | A1 * | 7/2015 | Nicoleau | C04B 24/2694 524/5 |
| 2016/0176757 | A1 * | 6/2016 | Luke | C04B 28/02 106/711 |

FOREIGN PATENT DOCUMENTS

| | | |
|---|---|---|
| RU | 2253635 C1 | 6/2005 |
| WO | WO 2009/015769 A1 | 2/2009 |
| WO | WO 2010/026155 A1 | 3/2010 |
| WO | WO 2014/114782 A1 | 7/2014 |
| WO | WO 2014/183846 A1 | 11/2014 |

OTHER PUBLICATIONS

Baltakys, K., et al: "Influence of gypsum additive on the gyrolite formation process", Cement and Concrete Research, Mar. 1, 2010, vol. 40, No. 3, pp. 376-383.

Baltakys, K.: "Influence of gypsum additive on the formation of calcium silicate hydrates in mixtures with C/S=0.83 or 1.0", Materials Science—Poland, 2009, vol. 27, No. 4, 11 pages.

Chandra, S., et al: "Interaction of Silica colloid with Portland cement", Proceedings of the 10$^{th}$ International Congress on the Chemistry of Cement, Gothenburg, Sweden, Jun. 2-6, 1997, vol. 3, 3ii106, 6 pages.

Cuesta, Ana, et al: "Reactive belite stabilization mechanisms by boron-bearing dopants", Cement and Concrete Research, Apr. 1, 2012, vol. 42, No. 4, pp. 598-606.

Guerrero, A., et al: "Microstructure and mechanical performance of belite cements from high calcium coal fly ash", Journal of Am. Ceram. Soc. 2005, vol. 88 No. 7, pp. 1845-1853.

Hubler, Mija H., et al: "Influence of nucleation seeding on the hydration kinetics and compressive strength of alkali activated slag paste", Cement and Concrete Research 2011, vol. 41, pp. 842-846.

Kamei, Shinnosuke, et al: "A novel synthesis of phosphorus-substituted tobermorite with calcium silicate hydrate", Ceramic Society of Japan Journal, Jan. 1, 2014, vol. 122, No. 1428, pp. 664-667.

Matkovic, B. et al.: "Dicalcium silicates doped with phosphates", Sep. 1, 1988, Chemical Abstracts, vol. 109, No. 10, p. 335.

Puertas, F., et al: "A model for the C-A-S-H gel formed in alkali-activated slag cements", Journal of the European Ceramic Society, May 24, 2011, vol. 31, p. 2043.

Suherman, Phe Man, et al: "Determination of amorphous phase levels in Portland cement clinker", Powder Diffraction, Sep. 2002, vol. 17, p. 178.

Thomas, Jeffrey J., et al: "Influence of nucleation seeding on the hydration mechanisms of tricalcium siliate and cement", Journal Phys. Chem, Feb. 19, 2009, vol. 113, pp. 4327-4334.

Hewlett: "Lea's Chemistry of Cement and Concrete", Elsevier Science & Technology Books; Jan. 2004; ISBN 0750662565; pp. 32-33.

Star 224-AAM Alkali Activated Materials, State of the Art Report, RRILEM TC 224-AAM 2014; ISBN 978-94-007-7671-5; http://www.springer.com/engineering/civil+engineering/book/978-94-007-7671-5; 506 pages.

* cited by examiner

METHOD FOR THE MANUFACTURE OF CALCIUM SILICATE HYDRATE USED AS HARDENING ACCELERATOR IN CONCRETE AND CEMENT-BASED MATERIALS, CALCIUM SILICATE HYDRATE MANUFACTURED WITH SAID METHOD

The present invention is related to supplementary cementitious materials (SCMs) to be added to concrete before or during mixing to improve hardening properties of cementious materials. More particularly the present invention relates to a new and convenient industrial process for the manufacture of nucleating agents, including Calcium-Silicate-Hydrates (C-S-H) in the form of defective tobermorite.

BACKGROUND ART

Supplementary cementitious materials (SCMs) are admixtures consisting of powdered or pulverized mineral-based materials presenting pozzolanic capacity or latent hydraulic reactivity or both. Different SCMs can be found in real concrete mixes.

While the use of SCMs in general is becoming a clear trend for cement industry, their use in practice is limited in many cases by either price and/or for technical reasons. In this sense the use for example of nanosilica (NS) particles, Calcium Silicate Hydrates (C-S-H) nanoparticles, etc., which are reactive SCMs, increases the final price of cement clinker. On the other hand, the use of cheap but not very reactive varieties of SCMs, like flying ashes (FAs) cannot be raised because they would jeopardize the initial strength properties.

The interaction of the NS particles with Portland cement was first studied by S. Chandra and H. Bergqvist (*Proc. Int. Congr. Chem. Cem.* 1997, vol. 3, 3ii106, 6 pp), who showed that the addition of small amounts of colloidal nanosilica is enough to produce the same pozzolanic effect (capacity of the silica particle to react with CH to yield C-S-H) as higher quantities of silica fume (SF) do. These advantageous properties of the NS particles were attributed to their fineness (whereas the NS particles used by the authors had a specific area of 80 m$^2$/g, the specific surface of silica fume was only 15-25 m$^2$/g). Afterwards, intensive worldwide research experimental and computationally proved that, apart from the NS pozzolanic reactions, the use of NS particles implies an additional mechanism for the growth of silicate chains in C-S-H gel. This new mechanism involves reactions of the type "NS+C-S-H=C-S-H (new)", in which the new C-S-H gel has longer and more stable chains. However as already mentioned, while the use of minor amounts of NS particles largely improves the mechanical properties of concrete, their practical use is limited because of their high price (about 2500€/ton).

More recent experimental work (Thomas et. al., *J. Phys. Chem. C* 2009, vol. 113, p. 4327-4334) has demonstrated that the addition of C-S-H nanoparticles into Ordinary Portland Cements (OPC) exhibits a seeding effect (template effect) providing new nucleation sites within the pore space away from the particle surfaces. The same mechanism was afterwards described to occur in other cement varieties (Hubler et al., *Cement and Concrete Research* 2011, vol. 41, p. 842-846). The kinetic of the hydration process, and therefore, the hardening process can be tuned by varying with the amount of C-S-H nanoparticles added to the cement.

This simple idea, which is easily understood by conventional nucleation and growth models, was well received by the oil and gas sector, where a fine control of the oil-cement setting is crucial. Nevertheless, the synthesis of C-S-H nanoparticles is a quite troublesome process. Traditional approaches for synthesizing C-S-H particles, based on sol-gel routes are hardly scalable. Furthermore, the use of this new family of hardening accelerator nano-additives, which instead of acting through a puzzolanic mechanism acts as templates, is limited because of their high price (about 2500€/ton)

In order to overcome the disadvantages mentioned, alternative methods based on a regular hydrothermal treatment of materials containing CaO and $SiO_2$ to produce C-S-H particles have been reported. So far, however, none of them have been satisfactory in terms of cost effectiveness and seeding (nucleating) capacity. Generally speaking, known hydrothermal methods at low C/S ratios (0.8-1.5) for temperatures below 140° C. result in tobermorite minerals with crystalline structures that are considered as "too perfect" versions of the desired cementitious C-S-H gel presenting thus a low nucleating capacity. Besides, their formation is a quite slow process, requiring, typically, several days of continuous stirring in the hydrothermal chamber. Since, usually, increase of temperature is known to accelerate chemical reactions, the possibility of increasing the hydrothermal temperatures above 140° C. has been considered for obtaining defected tobermorite-like compounds more rapidly. Unfortunately what actually happens at temperatures higher than 140° C. is that other crystalline structures like xonotlite or girolite turn to be the stable ones. Even worse is the scenario with larger Ca/Si ratios between 1.5 and 2.5 where the hydrothermal treatments below ~100° C. only produce metastable solutions of portlandite and tobermorite-like crystals, while hydrothermal treatments at higher temperatures cause that the tobermorite-like structures metamorphose to more stable structures like afwillite ($C_{1.5}SH_{1.5}$) or α-$C_2$SH, which are minerals with little similarity to cementitious C-S-H gel showing low nucleating capacity.

Baltakys et al (*Materials Science-Poland* 2009, vol. 27, No. 4/1) disclose the preparation of C-H-S particles from primary mixtures of CaO/SiO2, with low molar ratios of Ca/Si of 0.83 and 1.0, and in the presence of gypsum at 200° C. It was established that the sulfate ions improve the synthesis of tobermorite at high temperature. However, this method yields crystalline structures that are considered as "too perfect" versions of the cementitious C-S-H gel, thus presenting a low nucleating capacity.

WO2010/026155 describes a process to obtain a hardening accelerator composition, containing a C-S-H product and a water-soluble comb polymer suitable as a plasticizer for hydraulic binders. The combination of polymers and C-S-H seeds is appealing from a technical point of view, but it complicates the synthesis process. Besides, the methodology rests on low temperature synthesis, preferably in the range between 0° C. and 100° C., something which produces long synthesis processes and expensive production costs. WO2010/026155 discloses the employment of dissolved aluminium and/or magnesium salts in the starting aqueous solutions used in the process to create defects in the resulting C-S-H via the introduction in the structure of other ions different from calcium and silicon, leading to an improved hardening acceleration effect. The C-S-H hardening acceleration effect is then enhanced by the defects obtained in the C-H-S structure. This occurs because the seeding capacity is dependent on the structural analogy to real cementitious C-S-H gel (i.e. the one that naturally appears upon the hydration process). The need of defects in the obtained structure is a key concept because cementitious C-S-H gel nanostructure is actually a much distorted version of crystalline Tobermorite mineral. In fact, while cementitious C-S-H gel stoichiometry can be written as $C_{1.7}SH_{1.8}$, the Tobermorite mineral is $Ca_5Si_6O_{16}(OH)_2.4H_2O$. So, both the Ca/Si ratio and the water content of cementitious C-S-H gel are much larger than the values found in Tobermorite mineral. This structural difference explains why the hardening ability of C-S-H seeds depends also on the Ca/Si ratio. However, again, reaction times to obtain the desired C-S-H particles with the process described in WO2010/026155 are very long, thus requiring high energy consumption and limiting its industrial application.

WO2014/183846 discloses hydrothermal treatment in an autoclave at 200° C. of a starting material containing sources for CaO and $SiO_2$ with a water/solids ratio from 0.1 to 100 and C/S ratios around 2. Staring materials are preferably waste and by-products. The resulting product is said to show enhanced latent hydraulic and/or pozzolanic reactivity and used as supplementary cementitious material. However, the disclosed process does not yield C-H-S with characteristics similar to cementitious C-S-H gel. More likely, this process yields mainly $\alpha$-$C_2SH$, which has a much lower seeding capacity. As already disclosed by Guerrero et. al. (*J. Am. Ceram. Soc.* 2005, vol. 88, p. 1845-1853), it is well known that regular hydrothermal treatments of wastes like FAs in a calcium rich environment yield hydrated products like $\alpha$-$C_2SH$ and katoite. Besides, the process disclosed by WO2014/183846 requires long residence times (around 16 hours).

In view of the above, there is still the need to provide nucleating agents, such as C-S-H particles resembling cementitious C-S-H gel, by simple and industrially scalable manufacturing processes which are cost effective and reactive.

SUMMARY OF THE INVENTION

The present inventors have developed a new process for manufacturing nucleating agents that are useful as hardening accelerators for concrete or other cementious materials that overcomes the disadvantages mentioned above. In particular, the method is cost-effective, scalable and short, and may conveniently use wastes and by-products as starting materials. In order to arrive at this convenient method the inventors have made intensive research to adjust the conditions of the reaction. Importantly, the inventors have found that the specific reaction conditions in combination with the use of minor amounts of a particular doping agent yields a product which contains nucleating agents, in particular at least C-S-H particles that closely resemble cementitious C-S-H gel. As disclosed in the examples below, it only takes around 4 hours to obtain a desirable product, which is a very significant improvement in comparison to prior art methods.

A first aspect of the present invention thus relates to a process for manufacturing of a slurry containing nucleating agents which comprises reacting at least one source of a calcium containing compound with at least one source of a silicon containing compound, in an aqueous media and in the presence of a doping agent selected from the group consisting of a compound containing P, a compound containing B, a compound containing S, and mixtures thereof; wherein: (i) the reaction is carried out at a temperature from 100 to 350° C.; (ii) the total molar ratio of Ca to Si is from 1.5 to 2.5, and (iii) the total molar ratio of doping agent to Si is from 0.01 to 2; provided that: (a) when the sole doping agent is a compound containing P, the total molar ratio of P to Si is from 0.1 to 2; (b) when the sole doping agent is a compound containing B, the total molar ratio of B to Si is from 0.01 to 2, and (c) when the sole doping agent is a compound containing S, the total molar ratio of S to Si is comprised from 0.1 to 2.

The obtained slurry comprises a significant proportion of C-S-H (or C-A-S-H, if Al is present in the starting materials as in particular embodiments) in the form of defective tobermorite. The inventors have characterised this C-(A)-S-H and found that it has a high structural similarity to cementious C-(A)-S-H gel (see example 7), showing a surprisingly high nucleating capacity. No prior methods allow to obtain this defective tobermorite in such convenient, cost effective conditions. The inventors have demonstrated that the presence of small amounts of the particular doping agents stabilizes the defected tobermorite phase that is formed during the reaction in detriment of crystalline and undesired phases like afwillite or $\alpha$-$C_2SH$. Additionally, depending on the doping agent used, other nucleating agents may be comprised in the obtained slurry. In particular, when P is used as doping agent, the slurry contains a high proportion of hydroxyapathite, which also shows a very high nucleating capacity.

Thus, another aspect of the invention provides for a slurry containing nucleating agents obtainable by the process of the invention. This slurry may be further processed to obtain a powder which is more suitable for transportation and use in the cement industry. Accordingly, another aspect of the invention refers to a powder containing nucleating agents obtainable by the process of the invention.

The obtained slurry, or powder, thanks to the high proportion of nucleating agents, may be used directly as hardening accelerators for concrete or other cement based materials. Alternatively, the obtained powder may be formulated to yield an additive composition for concrete or other cement based materials. Accordingly the invention also provides an additive composition for concrete or other cement based materials comprising the powder obtained by the process of the invention together with appropriate additives. Further, another aspect of the invention provides for use of the slurry, the powder or the additive composition according to the invention as hardening accelerator for concrete or other cement based materials.

Lastly, the invention provides, in another aspect, concrete or other cement based materials made with the slurry, the powder or the additive composition obtainable by the process of the invention.

BRIEF DESCRIPTION OF THE DRAWINGS

FIG. 9: shows the raise of the compressive strength ($\Delta R$ (%)) achieved by the use of different SCMs: NS: nanosilica, NA: nanoalumina; MS: microsilica and S: product obtained according to Example 1 a.

DETAILED DESCRIPTION OF THE INVENTION

Figure 1:
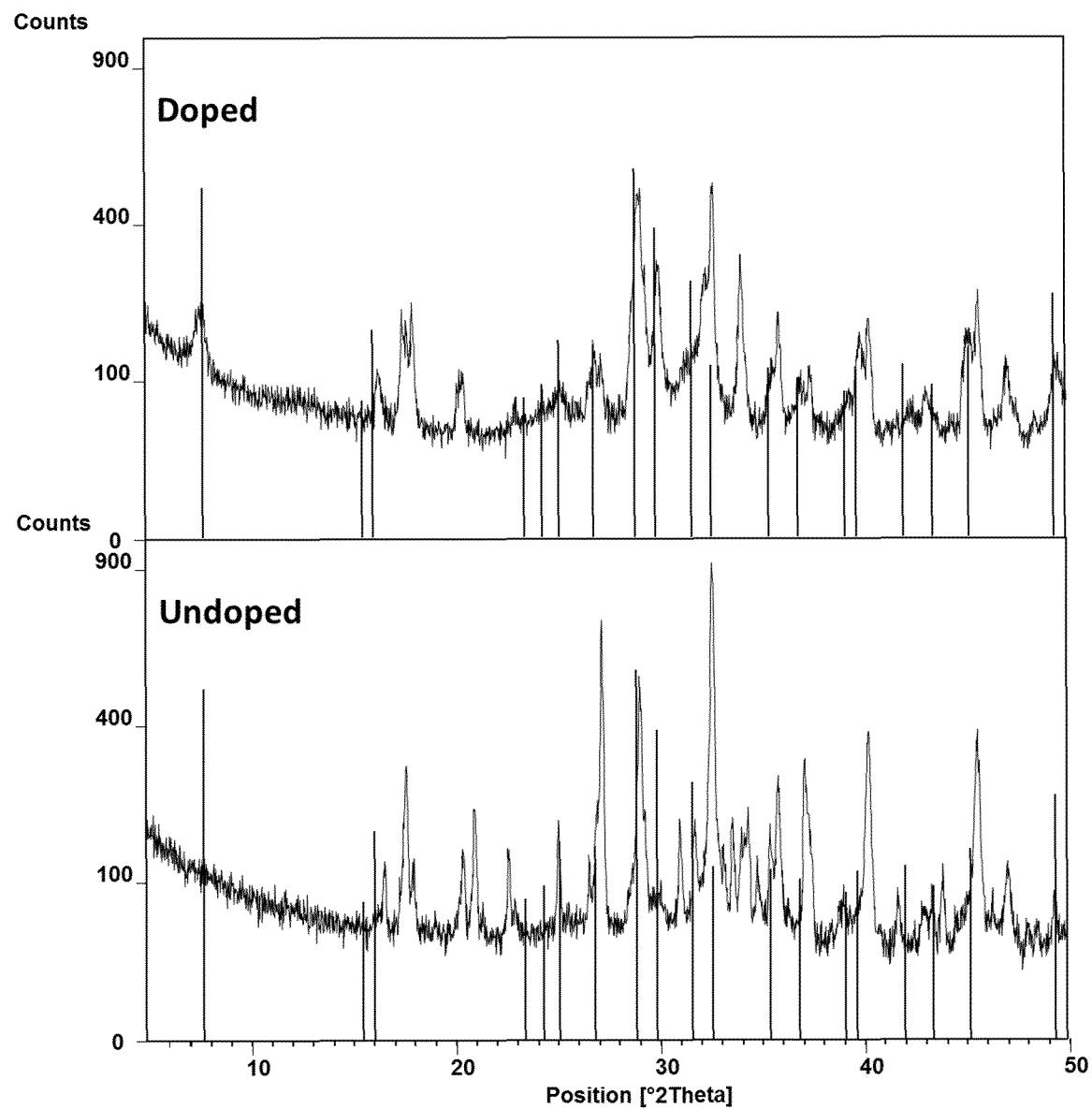
FIG. 1: shows the XRD pattern of the products resulting from hydrothermal treatment of an undoped sample (bottom panel) and a doped sample with B as doping element (upper panel) with a Ca/Si molar ratio of 2.2, B/Si molar ratio of 1.172, at 200° C., obtained according to Example 1 (a).

The present invention is related to a process for the manufacturing of a slurry containing nucleating agents as defined above. The process is convenient, industrially scalable, short and cost effective and requires the presence of a doping agent selected from the group consisting of a compound containing P, a compound containing B, a compound containing S, and mixtures thereof; wherein the total molar ratio of doping agent to Si is from 0.05 to 2.

A "nucleating agent" (herein sometimes also called "seeding agent") is understood as a compound that boosts the nucleation (or "seeding") process, i.e. the first step in the formation of either a new thermodynamic phase or a new structure via self-assembly or self-organisation. Since the hydration of cement is modeled as a nucleation and growth process, the nucleating agents of the present invention provide an appropriate template for hydration of cement or cement based materials and therefore accelerate their hardening. The process of the invention contemplates the formation of a product containing at least one, but sometimes more, nucleating agents. Particular nucleating agents in the present invention are Calcium Silicate Hydrates (C-S-H) in the form of defective tobermorite. When an Aluminium containing compound is present in the starting materials, Al partially substitutes Si in the calcium silicate hydrate structure thus yielding Calcium Aluminium Silicate hydrate (C-A-S-H) in the form of (Aluminium substituted) defective tobermorite, which is also a nucleating agent in the sense of the present invention. Both, C-S-H or C-A-S-H in the form of defective tobermorite may be identified by a "basal" signal 2Theta around 7.8° when analysed by XRD diffractometry at room temperature conditions. In the sense of the present invention, around 7.8° means that the XRD signal appears from 2Theta=5° to 2Theta=9°. In the sense of the present invention the term "Calcium (Aluminium) Silicate Hydrate" or "C-(A)-S-H" includes both C-S-H and C-A-S-H, the (A) meaning that when Al is present in the starting materials it partially substitutes Si in the C-S-H structure. The skilled person in the art is familiar with this nomenclature. Further, when P is present as doping agent in the process of the invention, the resulting slurry additionally contains hydroxyapatite as nucleating agent. This nucleating agents usually are insoluble compounds with small particle size, usually in the micro- and nano-meter range, that show elevated surface area. In the present description the terms "nucleating" and "seeding" are used indistinctively.

By "defective tobermorite" it is understood as a tobermorite or, when Al is present, Al-substituted tobermorite, with Mean Chain Length (MCL) of the silicate chains comprised from 2 to 25 and showing a XRD basal peak at 2Theta around 7.8°. The presence of defective tobermorite in the product obtained by the process of the invention has been determined by the inventors as disclosed in example 7. In some embodiments, the defective tobermorite obtainable by the process of the invention has MCL from 3 to 20, particularly from 5 to 14, more particularly from 8 to 13 and showing a XRD basal peak at 2Theta around 7.8°.

In the sense of the present invention a "doping agent" is a compound that, added to a reaction, typically at low concentrations, allows for the reaction to proceed to the desired product at conditions that are more convenient when compared with the un-doped reaction. In the present invention the doping agents significantly reduce the time to obtain the desired products, i.e. the nucleating agents defined above. It is demonstrated by the present inventors that the present doping agents stabilizes at high temperature a defective tobermorite that is structurally similar to cementious C-S-H gel and has similar nucleating effect.

The term "ratio of A to B" is understood, as generally in the art, as the proportion of A with respect to B and is generally expressed as A/B. The ratio may be expressed as "molar" ratio or ratio "by weight". Molar ratio is usually employed for chemical reactions and represents the proportion of the compounds when expressed in molar concentration. Ratio by weight represents the proportion when expressed in % by weight concentration.

In the field of cementious materials, the compounds containing Ca and Si are typically CaO and $SiO_2$, but these are not the only compounds that can be used as starting materials in the present invention. Therefore "total molar ratio" of, for example, Ca to Si, it is understood the molar ratio of all compounds containing Ca to all compounds containing Si.

In some embodiments of the first aspect of the invention the total molar ratio of the doping element to silicon is comprised from 0.01 to 2. In other embodiments, the total molar ratio of the doping element to silicon is comprised from 0.05 to 1. In particular embodiments the total molar ratio of the doping element to silicon is comprised from 0.05 to 0.5, more particularly from 0.06 to 0.5, more particularly from 0.8 to 0.5, more particularly from 0.1 to 0.4, for example, 0.1, 0.15, 0.17, 0.18, 0.19, 0.2, 0.21, 0.22, 0.23, 0.24, 0.24, 0.26, 0.27, 0.28, 0.29, 0.3, 0.31, 0.32, 0.33, 0.34, 0.35, 0.36, 0.37, 0.38 or 0.39.

The amount of the doping agent differs depending of the selected compound and whether it is used on its own or together with another doping agent.

One embodiment provides a process for the manufacturing of a slurry containing nucleating agents which comprises reacting at least one source of a calcium containing compound with at least one source of a silicon containing compound, in an aqueous media and in the presence of a doping agent selected from the group consisting of a compound containing P, a compound containing B, a compound containing S, and mixtures thereof; wherein: (i) the reaction is carried out at a temperature comprised from 100 to 350° C.; (ii) the total molar ratio of Ca to Si is from 1.5 to 2.5, and (iii) the total molar ratio of doping agent to Si is from 0.01 to 2; provided that: (a) when the sole doping agent is a compound containing P, the total molar ratio of P to Si is from 0.1 to 0.5; (b) when the sole doping agent is a compound containing B, the total molar ratio of B to Si is comprised from 0.05 to 0.5, and (c) when the sole doping agent is a compound containing S, the total molar ratio of S to Si is comprised from 0.1 to 0.5. In a particular embodiment: (a) when the sole doping agent is a compound containing P, the total molar ratio of P to Si is from 0.15 to 0.4, for example 0.2, 0.25, 0.3 or 0.35; (b) when the sole doping agent is a compound containing B, the total molar ratio of B to Si is comprised from 0.08 to 0.2, for example 0.1, 0.13, 0.15 or 0.18, and (c) when the sole doping agent is a compound containing S, the total molar ratio of S to Si is comprised from 0.15 to 0.4, for example 0.2, 0.25, 0.3 or 0.35.

In some embodiments, the doping agents may be combined and the proportions of each doping agent may differ from when they are used as sole doping agents. When one or more compounds containing P are used in the reaction in combination with other doping agents, the total molar ratio of P to Si is comprised from 0.01 to 2, particularly from 0.05 to 1, more particularly from 0.06 to 1, more particularly from 0.07 to 0.7, more particularly from 0.8 to 0.4. When one or more compounds containing B are used in the reaction in combination with other doping agents, the total molar ratio of B to Si is comprised from 0.01 to 2, particularly from 0.04 to 0.5, more particularly from 0.05 to 0.2. When one or more compounds containing S are used in the reaction in combination with other doping agents, the total molar ratio of S to Si is comprised from 0.005 to 2, particularly from 0.01 to 1, more particularly from 0.05 to 0.5.

In some embodiments the doping agent is a mixture of a compound containing B and a compound containing P, wherein the total molar ratio of P+B to Si is comprised from 0.01 to 2, particularly from 0.05 to 1, more particularly from 0.06 to 1, more particularly from 0.1 to 0.4. In other particular embodiments the doping agent is a mixture of a compound containing B and a compound containing S, wherein the total molar ratio of B+S to Si is comprised from 0.01 to 2, particularly from 0.05 to 1, more particularly from 0.06 to 1, more particularly from 0.1 to 0.4. In other embodiments the doping agent is a mixture of a compound containing P and a compound containing S, wherein the total molar ratio of P+S to Si is comprised from 0.01 to 2, particularly from 0.05 to 1, more particularly from 0.06 to 1, more particularly from 0.1 to 0.4. In other embodiments the doping agent is a mixture of a compound containing P, a compound containing B and a compound containing S, wherein the total molar ratio of P+B+S to Si is comprised from 0.01 to 2, particularly from 0.05 to 1, more particularly from 0.06 to 1, more particularly from 0.1 to 0.4.

The inventors have found that some mixtures of doping agents have synergistic effects. For example, use of a very low amount of a compound containing S in combination with a compound containing B as doping agents improves the quality (i.e. the seeding capacity) of the product obtained by the process of the invention with respect to using B alone (see FIG. 3). However, use of the same low amount of S does not provide a product with good seeding capacity. It therefore seems that use of S as doping agent at low S to Si molar ratios is only effective when S is used in combination with B and/or P (S as additional doping agent). In particular, S can be used as additional doping agent at a molar ratio S to Si as low as 0.01. When used as sole doping agent, the amount of S should be above 0.1.

The particular doping agent may be selected from the group of salts and oxides containing B, P or S. Non limiting examples of doping agents are pyridine-3-trihydroxyborate ($C_5H_7BNNaO_3$), Borax in any hydration state, such as $Na_2B_4O_7 \cdot 10H_2O$, phosphorus pentaoxide ($P_2O_5$), phosphoric acid ($H_3PO_4$), sodium sulphate ($NaSO_4$), or potassium sulfate ($K_2SO_4$). According to a particular embodiment the doping agent is borax, in any of its hydration states, for example $Na_2B_4O_7.10H_2O$. Borax is conveniently used at molar ration borax to Si comprised from 0.01 to 2, particularly from 0.025 to 0.5, more particularly from 0.05 to 0.5, when used as sole doping agent. According to another particular embodiment of the invention the doping agent is $P_2O_5$. $P_2O_5$ is conveniently used at a molar ration $P_2O_5$ to Si comprised from 0.01 to 2, particularly from 0.05 to 1, more particularly from 0.01 to 1, more particularly from 0.1 to 0.5 when used as sole doping agent. According to another particular embodiment the doping agent is a combination of borax and sodium or potassium sulphate. In said combination borax is conveniently used at a borax to Si molar ration comprised from 0.01 to 0.2 and sodium or potassium sulphate are conveniently used at a Na or K sulphate to Si molar ratio comprised from 0.01 to 0.5.

According to a particular embodiment the total molar ratio of Ca to Si (Ca/Si) is comprised from 1.6 to 2.4. According to another particular embodiment the total molar ratio Ca/Si is from 1.8 to 2.4. According to another embodiment the total molar ratio Ca/Si is from 1.7 to 2.3, in particular from 1.8 to 2.2, for example 1.9, 2 or 2.1.

The calcium containing compound and the silicon oxide containing compound that can be used in the process of the invention are not especially limited.

The calcium containing compound may be a calcium oxide, a calcium hydroxide or a calcium salt, in particular a water soluble calcium salt. In some embodiments the calcium salts are calcium salts of carboxylic acids. In other embodiments the calcium salt is calcium chloride, calcium nitrate, calcium formate, calcium acetate, calcium bicarbonate, calcium bromide, calcium carbonate, calcium citrate, calcium chlorate, calcium fluoride, calcium gluconate, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate, calcium aluminate, tricalcium silicate and/or dicalcium silicate. Calcium hydroxide and/or calcium oxide are of particular interest for the process of the invention because of their strong alkaline properties. In other embodiments, the calcium containing compound is a calcium silicate, in particular a soluble calcium silicate.

The silicon containing compound is typically a silicon dioxide containing compound, in particular, a water-soluble silicate compound, such as sodium silicate, potassium silicate, waterglass, aluminium silicate, tricalcium silicate, dicalcium silicate, calcium silicate, silicic acid, sodium metasilicate or potassium metasilicate. In advantageous embodiments the silicon dioxide containing compound is selected from sodium metasilicate, potassium metasilicate, waterless, and mixtures thereof because of their extremely good solubility in water. The silicon dioxide containing compound used in the process of the invent may also be microsilica, pyrogenic silica, precipitated silica, blast furnace slag, and/or quartz sand. Small particle sizes of the silicon dioxide containing material are particularly suitable, especially particle sizes below 1 µm. In some embodiments, the silicon dioxide containing compound is selected from microsilica, pyrogenic silica, precipitated silica and mixtures thereof. Precipitated and/or pyrogenic silica are particularly suitable.

One or more calcium containing compounds as defined above and one or more silicon dioxide containing compounds as defined above can be used for the process of the invention, so long as their total molar ratio Ca/Si is within the range comprised from 1.5 to 2.5, particularly from 1.7 to 2.4, more particularly from 1.8 to 2.3.

Additional metal containing compounds may be present in the process of the invention. In a particular embodiment, the process of the invention additionally comprises reacting a source of an Al containing compound. The Al containing compound may be any aluminate, such as sodium aluminate, monocalcium aluminate, aluminium hydroxides or aluminium salts. In a particular embodiment the source of Al containing compound is a waste product like FA, blast furnace slag, or salt slag. As mentioned above, when Al is present in the reaction the resulting slurry contains a defective tobermorite where Si is partially substituted by Al, i.e. it contains C-(A)-S-H in the form of defective tobermorite. The Al containing compound may be present as a trace element or in a substantial quantity. For instance, the Al/Si total molar ratio may be comprised from 0.0001 to 1.25, particularly from 0.001 to 1, more particularly from 0.001 to 0.75. Mg, Fe, Ti or Mn containing compounds may also be present in the reaction.

The calcium containing compound(s) and/or the silicon containing compound(s) may be provided by particular sources. Advantageously, the source of a calcium containing compound and the source of a silicon containing compound are selected from industrial wastes, industrial by-products, and mixtures thereof. This materials are cost-effective sources of calcium containing compound(s) and/or silicon containing compound(s). Using this sources further has the advantage that the present process is environmentally friendly.

In one embodiment, the source of silicon containing compound(s) is selected from the group of industrial wastes or by-products selected from fly ash, silica fume, ground granulated blast furnace slag, salt slag, glass, or mixtures thereof. In another embodiment, the source of calcium containing compound(s) is acetylene lime slurry. According to a particular embodiment the source of silicon containing compound is fly ash (FA), a by-product from the coal industry. According to another particular embodiment the silicon containing material is FA and the calcium containing compound is acetylene lime slurry. According to another particular embodiment the silicon containing material is glass and the calcium containing compound is an acetylene lime slurry.

The starting materials, i.e., the Ca and the Si containing compounds, usually have a small particle size, typically below 1 µm. In particular embodiments, the particle size is comprised from 0.001 to 1 µm, or from 0.01 to 1 µm.

The process can be carried out in any conventional device, such as an autoclave. Said process is an hydrothermal reaction carried out in an aqueous media where the solid to water ratio by weight is comprised from 0.001 to 50, particularly from 0.1 to 25, more particularly from 0.5 to 10, even more particularly from 0.5 to 5. In general, the amount of water in the reaction is such that the full hydration of the solid materials is achieved.

The process of the invention takes place as above mentioned at a temperature comprised from 100 to 350° C. In particular embodiments the temperature is comprised from 140 to 250° C. In other particular embodiments, the temperature is comprised from 150 to 230° C., particularly from 160 to 220° C., more particularly from 170 to 210° C., for example 180, 190 or 200° C.

The pressure during the hydrothermal treatment is endogenous (the one self-generated during the treatment at the selected temperature), or is kept constant. According to a particular embodiment the pressure is comprised between 0.1 MPa and 50 MPa. According to another particular embodiment the pressure is endogenous.

The process according to a particular embodiment may be carried out under stirring to prevent decantation of the solids present in the reaction mixture when they are more in suspension than dissolved because of its nature.

The hydrothermal treatment can last from minutes to hours depending on the specific calcium containing compound and silicon containing compound, the doping agent, the pressure, or the temperature. Typically the treatment time may broadly vary between 30 minutes to 24 hours. But advantageously, the present process allows to obtain a product containing a significant proportion of nucleating agents in a very short time. Thus, according to a particular embodiment, the duration of the process of the invention is comprised from 2 to 10 hours, more particularly from 2 to 8 hours, more particularly from 2 to 6 hours, for example 3, 3.5, 4, 4.5, 5 or 5.5 hours. This implies that the present method is far less time-consuming and consequently less energy-consuming that prior art methods. Thus the present method is more convenient for industrial production.

The process defined above yields a slurry which contains a high proportion of nucleating agents. Consequently, one aspect of the invention refers the slurry obtainable by the above defined process. In a particular embodiment, the nucleating agents contained in the obtained slurry comprise Calcium (Aluminium) Silicate Hydrate (C-(A)-S-H) in the form of defective tobermorite. However, other nucleating agents like hydroxyapatite that are particularly useful as accelerators for the hardening of concrete have been found in the product depending on the doping agent used. Thus, in a particular embodiment, the nucleating agents contained in the slurry obtainable by the process of the invention comprise hydroxyapatite. In some embodiments the slurry contains defective tobermorite and hydroxyapatite.

The obtained slurry may be used directly as hardening accelerator or further processed to obtain a dry product which is more suitable in terms of transportation and use in the cement industry. For example, the obtained slurry may be cooled down, and the cool slurry can be filtered and subsequently dried. Dried in the context of the present invention refers to a water content between 5-1% by weight. Drying is done at a temperature comprised from 80 to 150° C., preferably from 90 to 140° C. In a particular embodiment of the invention the hydrothermal process defined above is followed by the steps of filtering the resulting slurry, drying at a temperature comprised from 80 to 150° C., and disagglomering the resulting solid to obtain a powder. In particular embodiments the drying is done at a temperature comprised from 100 to 135° C., more particularly from 10 to 130° C., for example 110, 115, 120 or 125° C. Again, the dried product may be used as hardening accelerator or may be further disagglomerated to render a powder containing nucleating agents. Disagglomeration may be performed by any technique known in the art.

After disagglomeration, a fine powder is obtained containing nucleating agents, such as C-(A)-S-H in the form of defective tobermorite (and, sometimes, also hydroxyapatite), whose average particle diameter and surface areas depend on the characteristics of the disagglomeration step, the nature of the calcium containing compound and the silicon containing compound, etc. Typically the average particle diameter ranges from 0.5 µm to 100 µm, more particularly from 0.7 µm to 30 µm, and its specific surface areas are typically from 3000 $m^2$/kg to 10 $m^2$/kg, in particular from 59 $m^2$/kg to 2250 $m^2$/kg. The fineness and surface area of the resulting particles may me however easily modified by mechanical means, such as grinding.

The defective tobermorite and the hydroxyapatite obtained by the process of the invention are appropriate templates for increasing the cementitious C-(A)-S-H nucleation and growth. As a result, they present seeding capacity and hardening accelerator properties, when used as additives in concrete or other cement based materials. The effect of the doping elements in the appearance of the defective tobermorite is displayed in FIGS. 1 to 8, where the XRD spectra of different samples without and with doping elements are compared. As it can be seen from the obtained spectra the undoped formulations do not give any signal at 2Theta=7.8° while this signal is clearly present for the formulations doped according to the invention. This peak is the so-called basal peak, and is a clear hallmark for the presence of tobermorite-like crystallite features. The C-(A)-S-H tobermorite-like phase contained in the samples was further characterised in order to define its structure (see example 7). The inventors observed that this phase is constituted by defective tobermorite which has a structure which is very similar to cementitious C-(A)-S-H gel. Other important C-(A)-S-H peaks to observe are likewise at 2Theta: 16.2°, 29°, 30°, 31.7° and 49.4°. Likewise, samples doped with P also displayed a signal at 25.9°, 31.7°, 32.2° and 32.9° which shows the presence of hydroxyapatite.

The inventors also quantified the content of nucleating agents in the powder obtained by the method of the invention finding that they are present at significant proportions (see example 7). Thus, in some embodiments, the content of C-(A)-S-H in the form of defective tobermorite of the powder of the invention is comprised from 5 to 70% by weight, in particular from 8 to 50%, more particularly from 10 to 40%, more particularly from 15 to 30%. In other embodiments, the powder of the invention comprises from 1 to 30% by weight of C-(A)-S-H in the form of defective tobermorite and from 5 to 70% by weight of hydroxyapatite. Hydroxyapatite is formed when a compound containing P is used as doping agent. In particular embodiments the powder of the invention comprises from 5 to 20% by weight, particularly from 8 to 15% of C-(A)-S-H in the form of defective tobermorite and from 8 to 50% by weight, more particularly from 10 to 40%, more particularly from 15 to 30% of hydroxyapatite.

Figure 9:
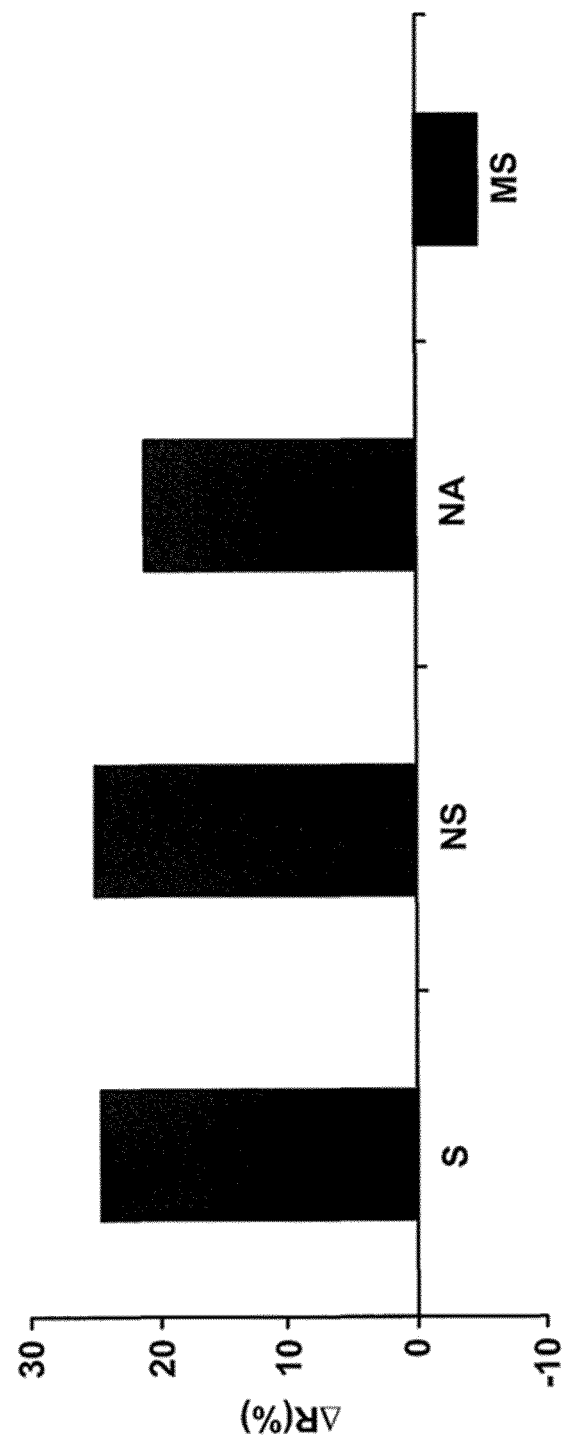

As shown in FIG. 9 the addition of the powder obtainable by the process according to the invention entails to achieve cement based materials, in particular cement pastes, with compressive properties as good as those achieved with the addition of NS particles, slightly better than those with NA additions and largely better than those with SF additions. Thus the process of the invention renders products containing nucleating agents which are at least as good as, or even better, than commonly used supplementary cementitious materials and concrete additives by a simple and industrially scalable process and at a much lower price compared with other methods.

The amount of slurry, agglomerated dry product, powder or additive of the invention in respect to the cement based material can vary in wide range. According to one embodiment, the agglomerated dry product, powder or additive of the invention is used in a range comprised from 0.01 to 20% by weight in respect to the cement based material. In particular embodiments the amount of agglomerated dry product, powder or additive of the invention with respect to the cement based material is comprised from 0.05 to 15% by weight, more particularly from 0.5 to 10% by weight, even more particularly from 1 to 8% by weight, for example 1.5, 2, 2.5, 3, 3.5, 4, 4.5, 5, 5.5, 6, 6.5, 7 or 7.5% by weight.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

To analyze the impact of the doping elements in the production of a product containing nucleating agents, in particular, C-(A)-S-H in the form of defective tobermorite, a set of experiments has been carried out.

The XRD patterns in all the examples were obtained using a Phillips X'Pert Diffractometer (Eindhoven, the Netherlands) with Ni-filtered Cu Kα radiation used. The XRD pattern of the products resulting from the described hydrothermal treatments for the undoped and doped samples, after filtering, drying and disagglomering, are presented in FIGS. 1 to 8. In all the cases it can be seen that the undoped samples do not give any signal at 2Theta=7.8° while the signal is clearly present for the doped samples. This peak is the so-called basal peak, and is a clear hallmark for the presence of tobermorite-like crystallites. Other important tobermorite-like crystallites peaks like those at 16.2°, 29°, 30°, 31.7° and 49.4° are likewise identified by vertical lines in the panels and confirm the pivotal role of the doping element in their appearance.

The BORAX used in the examples was $Na_2B_4O_7 \cdot 10H_2O$ (reagent grade, Sigma Aldrich). The phosphorous containing doping agent used in the examples was $P_2O_5$ (reagent grade, Panreac).

Formulations were subjected to hydrothermal treatment at different temperatures, endogenous pressure, in an autoclave under continuous stirring. The time was 4 hours, unless otherwise stated. After hydrothermal treatment the obtained slurry was subjected to a posterior treatment for obtaining a powder. Briefly, the slurry was firstly vacuum filtered with a Buchner funnel and filter paper. The solid obtained was later dried at a temperature between 60 and 110 C. Finally, the bulk solid was manually disagglomerated with a mortar and pestle to obtain a fine powder.

Example 1

Effect of Doping Elements

The same batch of Fly Ashes and acetylene lime slurry suspension was employed in all cases. The chemical composition of the Fly Ashes as determined by chemical analysis (CA) according to the Spanish standard UNE-EN 196-2 and by Fluorescence (FRX) is shown in Table 1.

TABLE 1

|  | LOI | $SiO_2$ | $Al_2O_3$ | $Fe_2O_3$ | MgO | $K_2O$ | $Na_2O$ | CaO | $SO_3$ |
|---|---|---|---|---|---|---|---|---|---|
| % CA | 5.86 | 50.34 | 24.9 | 4.83 | 1.81 | 1.58 | 0.55 | 5.89 | 0.29 |
| % FRX | 5.78 | 50.80 | 25.37 | 5.14 | 1.75 | 1.73 | 0.44 | 5.97 |  |

LOI = Loss on ignition

The acetylene lime slurry was a calcium-rich water suspension generated by the Acetylene industry. The suspension consisted of portlandite ($Ca(OH)_2$, containing a small amount of silica (<2 wt %) and some impurities such as Al, S (<0.7 wt %), Fe, Mn, and Sr (<0.1 wt %). The solid fraction in the suspension was 33% by weight.

All formulations were subjected to hydrothermal treatment at 200° C. during 4 hours under continuous stirring and endogenous pressure. The resulting slurry was further processed as described above to obtain a powder.

(a) Effect of Boron as Doping Element

Two samples were prepared and compared by XRD. Both the undoped and doped samples had a Ca/Si=2.2. Besides, the doped samples were doped with Borax in a molar ratio so that the molar ratio B/Si=0.172

For the undoped formulation the starting material corresponded to 107 g of FA and 314 g of acetylene lime slurry. For the doped formulations the starting materials comprised 91 g of FA, 267 g of the acetylene lime slurry suspension and 12.73 g of Borax so as to give a molar ratio B/Si=0.172. In both cases water was added taking into account the amount already present in the suspension until reaching 1 liter in total.

The XRD pattern of the products resulting from the mentioned treatment for the undoped (bottom panel) and doped (upper panel) samples are presented in FIG. 1. As can be seen, the undoped product does not exhibit the characteristic peak at 2Theta around 7.8°, while the doped product does contain said peak. This fact reflects the importance of the B doping agents for stabilizing the tobermonite-like structures in a hydrothermal treatment at 200° C.

(b) Effect of Phosphorus as Doping Element

Two samples were prepared and compared by XRD. Both the undoped and doped samples had a Ca/Si=2. Besides, the doped samples were doped with $P_2O_5$ in a molar ratio so that the molar ratio P/Si=0.35

For the undoped formulation the starting material corresponded to 107 g of FA and 314 g of acetylene lime slurry. For the doped formulations the starting materials comprised 96.3 g of FA, 255.15 g of the acetylene lime slurry suspension and 20.06 g of $P_2O_5$ so as to give a molar ratio P/Si=0.35. In both cases water was added taking into account the amount already present in the suspension until reaching 1 liter in total.

Figure 2:
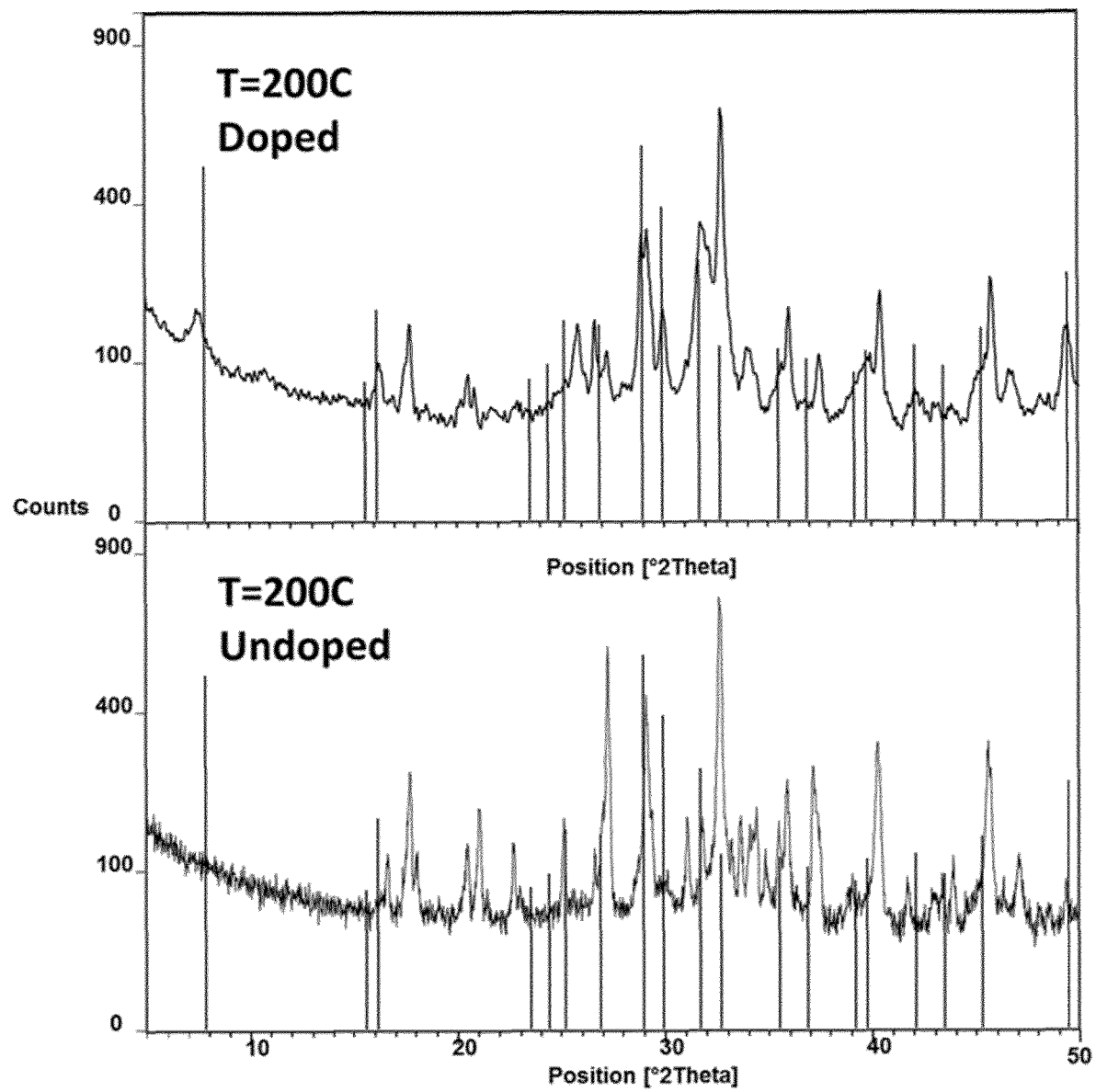
FIG. 2: shows the XRD pattern of the products resulting from a hydrothermal treatment of an undoped sample (bottom panel) and a doped sample with P as doping element (upper panel), with a Ca/Si molar ratio of 2, P/Si molar ratio of 0.35, at 200° C. obtained according to Example 1 (b).

FIG. 2 shows the XRD of the products without doping agents (bottom panel) and with a phosphorus containing doping agent: $P_2O_5$ (upper panel). As can be seen, the undoped product does not exhibit the characteristic peak at 2Theta around 7.8°, while the doped product does. This fact reflects the importance of the P for stabilizing the tobermonite-like structures in a hydrothermal treatment at 200° C.

(c) Effect of Boron and Sulfur as Doping Element

The possibility of combining different doping elements in the same reaction process has been analyzed. To this end two samples have been prepared. The first one containing Boron as doping element, in a molar proportion B/Si=0.053, and second one where apart from Boron at the same molar proportion of B/Si=0.053 a sulfur containing doping agent (gypsum) has been added in a proportion so as to present a molar ratio S/Si=0.011.

In both formulations 107 g of FA (chemical composition shown in Table 1) and 91.26 g of pure lime were used and both samples had a molar ratio Ca/Si=2. For the formulations containing only Boron as doping agent Borax was added. For the formulation with a combination of Boron and Sulfur as doping elements, the "doping" addition consisted in 4.25 g of Borax and 2.45 g of $Na_2SO_4$. Each preparation was mixed with 1 liter of water.

Figure 3:
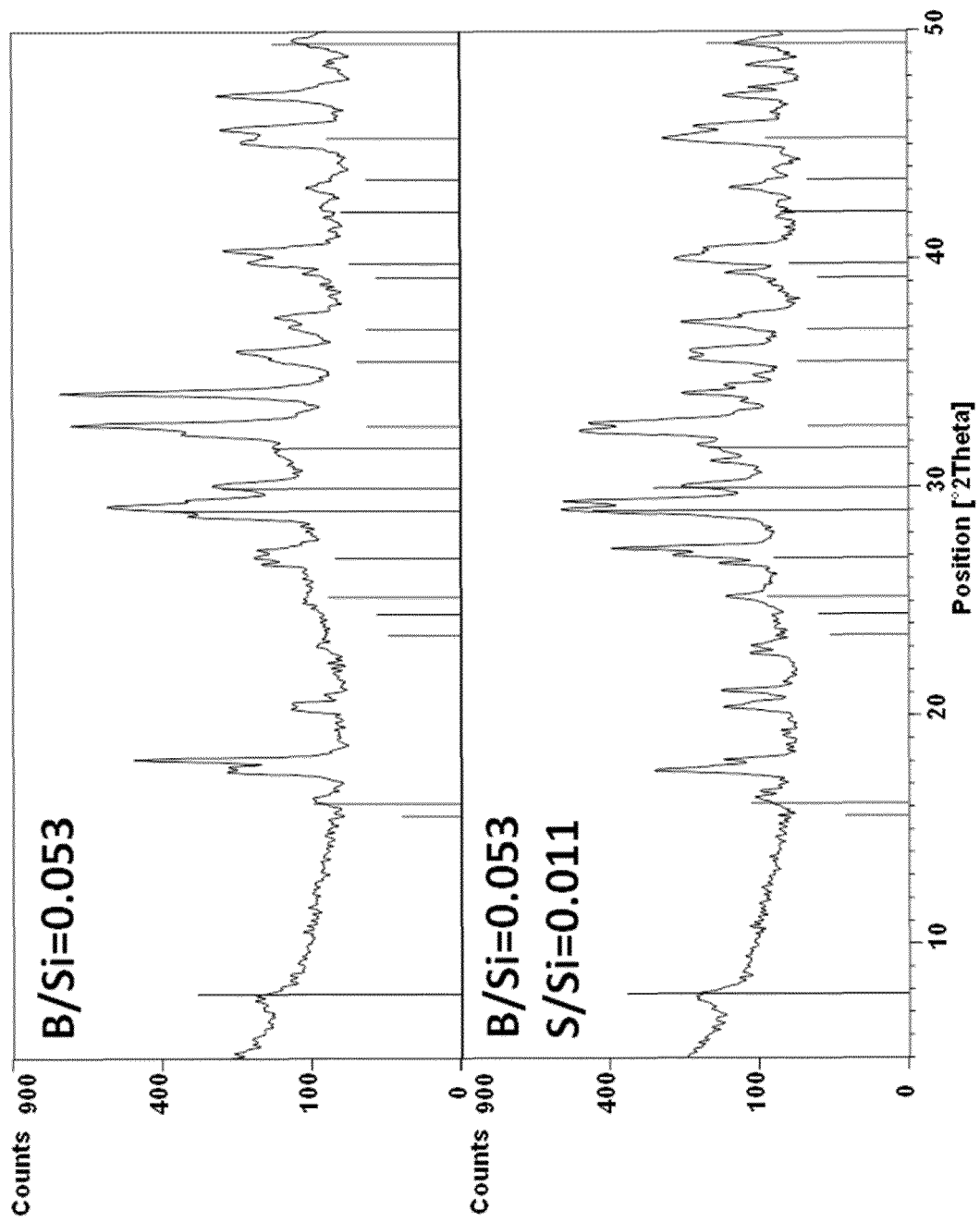
FIG. 3: shows the XRD spectra of a sample with B as doping element (upper panel, B/Si=0.053) and of a sample with B (B/Si=0.053) and S (S/Si=0.011) as doping elements (bottom panel), with a Ca/Si molar ratio of 2, at 200° C., according to Example 1 (c).

The XRD pattern of the products resulting from the treatments for both samples are presented in FIG. 3. Top panel corresponds to the sampled doped with Boron and the bottom one to the sample where the a combination of doping elements (Boron and Sulfur) was employed.

As can be seen, both formulations exhibit the characteristic signal of the basal-peak (2Theta=7.8°) which indicates the presence of tobermorite-like C-(A)-S-H, something remarkable in view of the low concentration of the doping elements. This is especially relevant in the case of the sample doped with Boron only (B/Si=0.053). Also from FIG. 3 it can be concluded that the addition of a tiny amount of Sulfur as extra doping element (S/Si=0.011) improves the quality of the tobermorite-like C-(A)-S-H. It is worth noting that apart from the slight sharpening of the basal peak) (2Theta=7.8°, other peaks like those occurring at 2Theta=25° or 2Theta=26° are much better defined.

Example 2

Effect of Doping Elements on the Thermal Stability

As explained in the background of the invention, the thermal stability of tobermorite-like structures declines when the hydrothermal temperature increases, and in particular reaches 120-140° C., leading to other phases without seeding capacity.

To analyze the impact of the doping elements in favoring the stabilization of the C-(A)-S-H tobermorite-like crystallites, a set of experiments has been carried out. Different hydrothermal temperatures (165° C., 175° C., 200° C., 225° C. and 250° C.) have been employed in hydrothermal processes with other conditions as defined above for example 1. Afterwards the resulting slurries were processed and the powders analyzed by XRD. The set of experiments have been carried out with different doping agents.

The batch of Fly Ashes and acetylene lime slurry suspension used was the same employed in Example 1

(a) Hydrothermal Temperatures 165° C., 175° C., 200° C.

Both the undoped and doped samples had a Ca/Si=2.2. Besides, the doped samples were doped with Boron in a molar ratio so that the molar ratio B/Si=0.172.

For the undoped formulation the starting material corresponded to 107 g of FA and 314 g of acetylene lime slurry. For the doped formulations the starting materials comprised 91 g of FA, 267 g of the acetylene lime slurry suspension and 12.73 g of Borax so as to give a molar ratio B/Si=0.172. In all cases water was added taking into account the amount already present in the suspension until reaching 1 liter in total.

Afterwards, all formulations were subjected to hydrothermal treatment at different temperatures.

Figure 4:
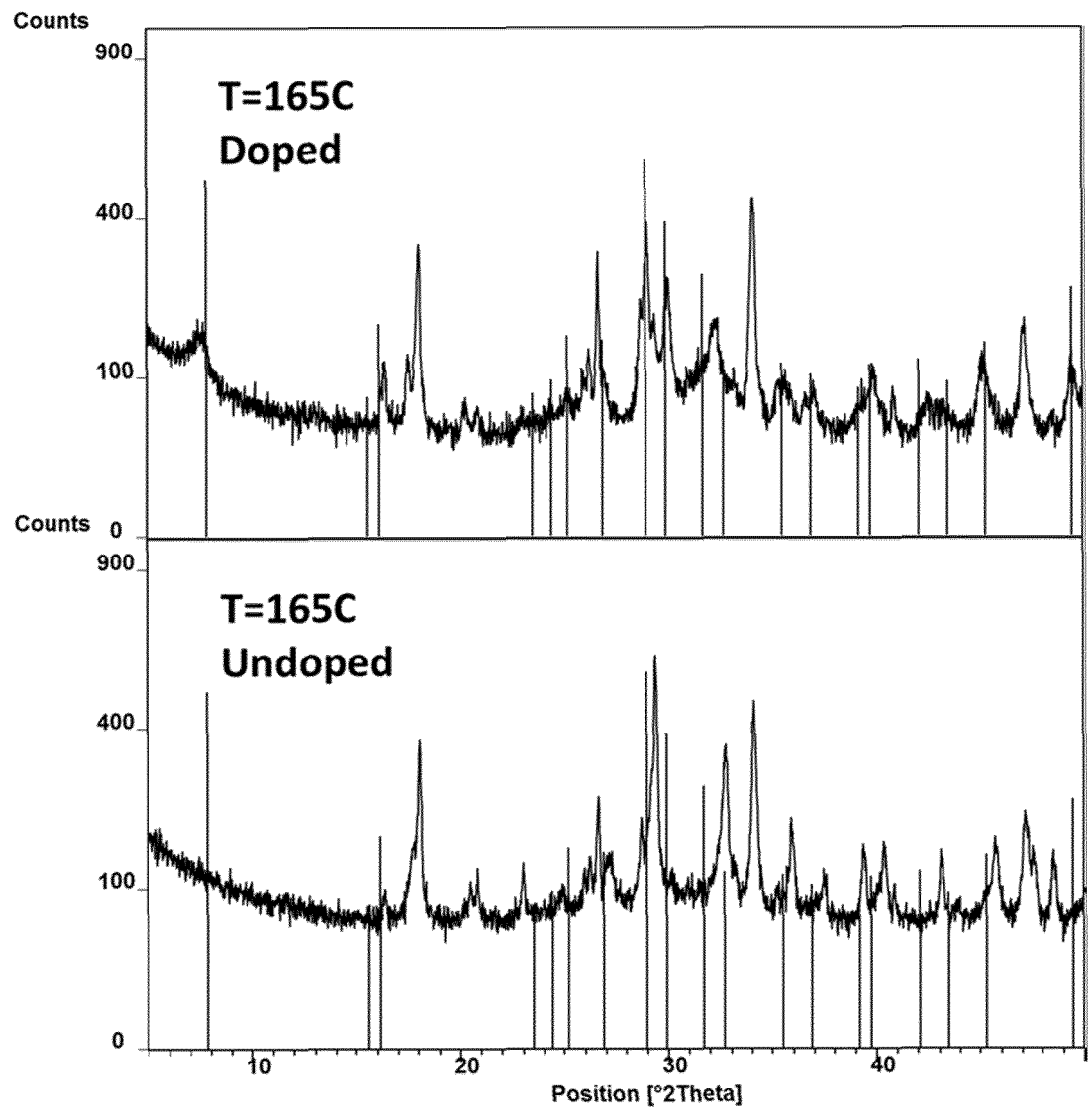
FIG. 4: shows the XRD spectra of a sample without doping element (bottom panel) and of a sample with B as doping element (upper panel), with a Ca/Si molar ratio of 2.2, B/Si molar ratio of 1.172, at 165° C., according to Example 2(a).
Figure 5:
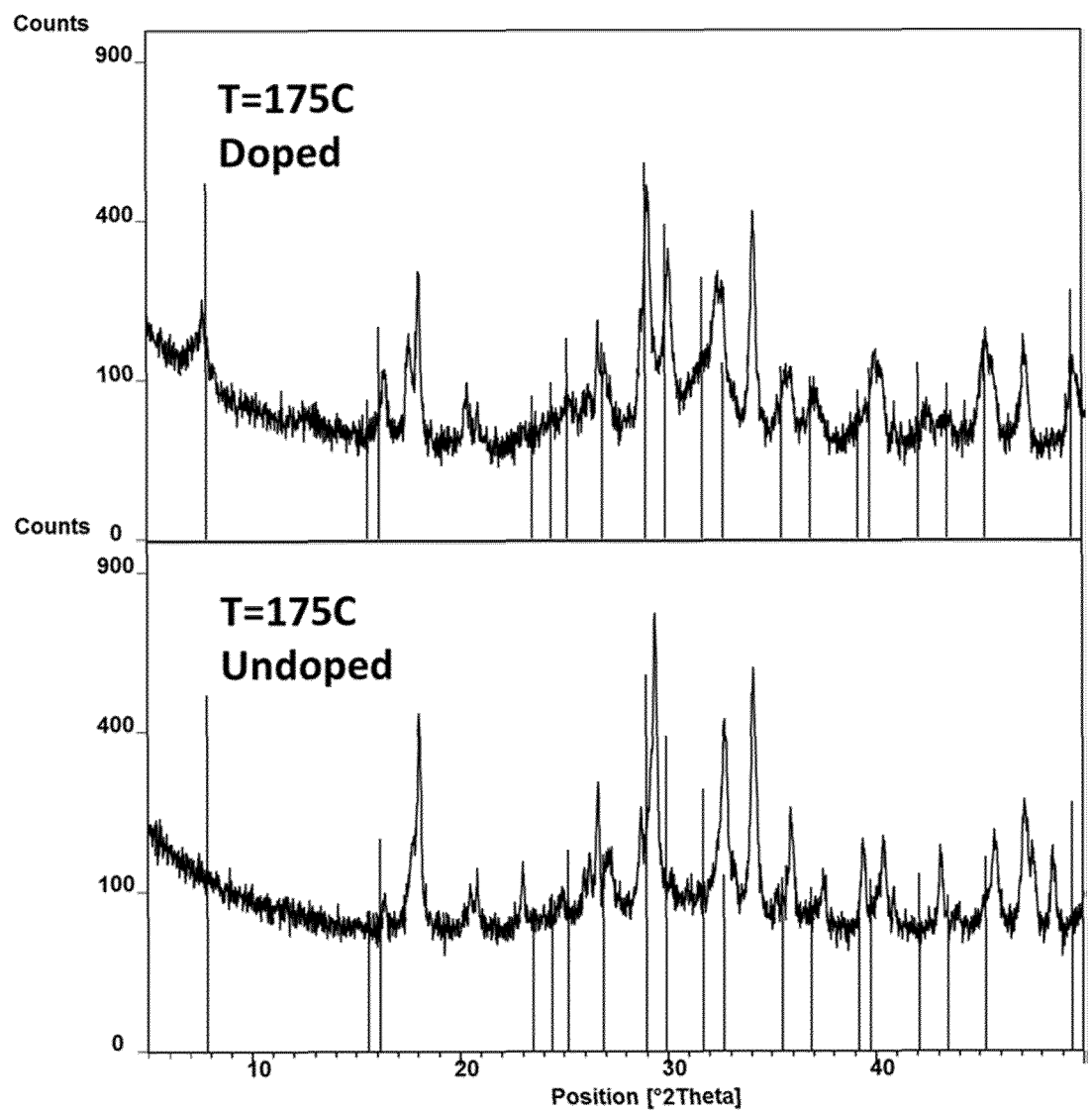
FIG. 5: shows the XRD spectra of a sample without doping element (bottom panel) and of a sample with B as doping element (upper panel), with a Ca/Si molar ratio of 2.2, B/Si molar ratio of 1.172, at 175° C., according to Example 2(a).

The XRD pattern of the products resulting from the mentioned hydrothermal treatments for the undoped and doped samples are presented in FIG. 1, FIG. 4 and FIG. 5 for hydrothermal temperatures of 200° C., 165° C. and 175° C. These figures show that the doped samples comprise tobermorite-like domains (basal peak at 7.8°), whereas the undoped ones does not. The obtained results confirm the relevance of the doping element for stabilizing tobermorite-like structures at high temperatures.

(b) Hydrothermal Temperatures 200° C., 225° C., 250° C.

Both the undoped and doped samples had a Ca/Si=2. Besides, the doped samples were doped with $P_2O_5$, the molar ratio P/Si being 0.35.

For the undoped formulation the starting material corresponded to 107 g of FA and 314 g of acetylene lime slurry. For the doped formulations the starting materials comprised 96.3 g of FA, 255.15 g of the acetylene lime slurry suspension and 20.06 g of $P_2O_5$, so as to give a molar ratio P/Si=0.35. In all cases water was added taking into account the amount already present in the suspension until reaching 1 liter in total.

Afterwards, all formulations were subjected to hydrothermal treatment at different temperatures.

Figure 6A:
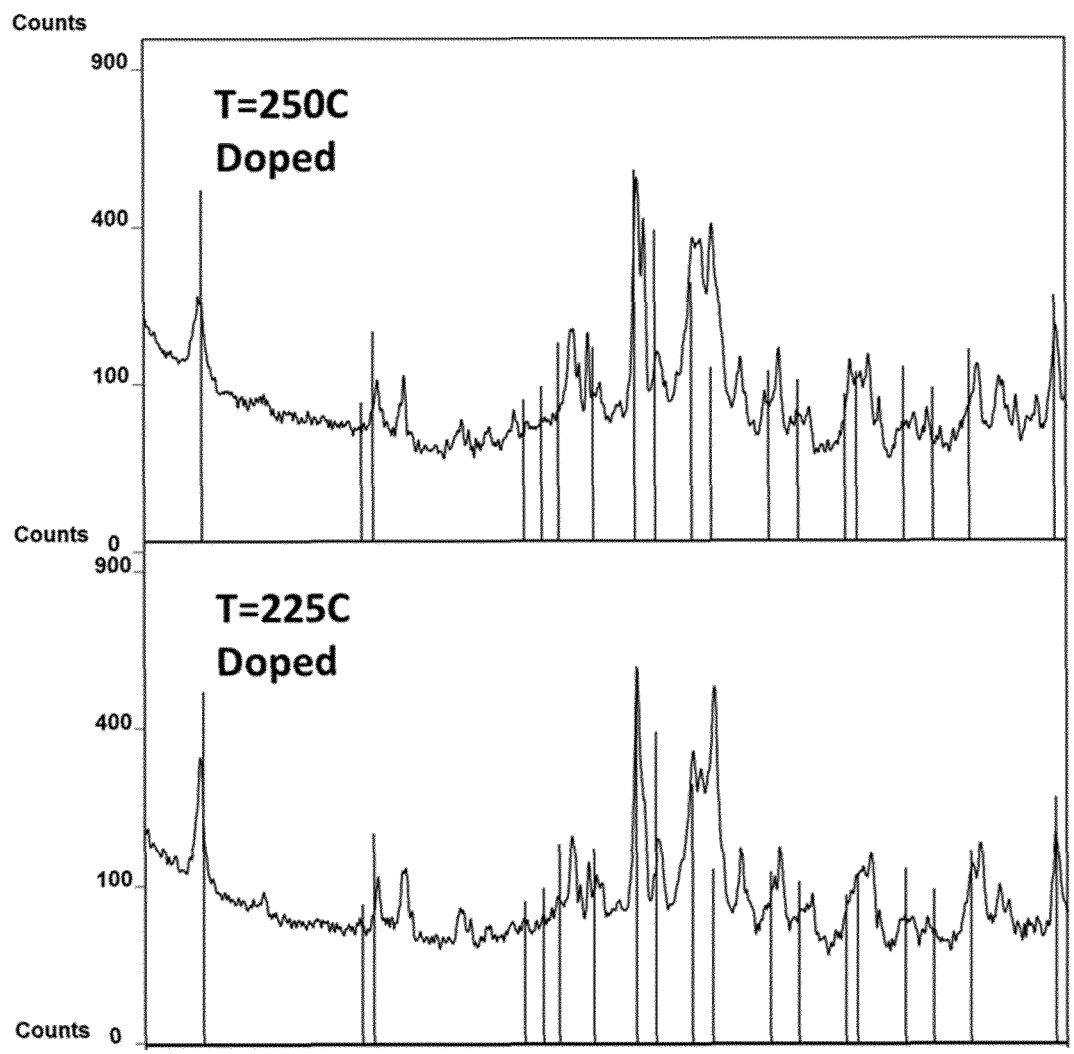
FIG. 6: shows the XRD spectra of different samples without doping element (bottom panel of FIG. 6B) and samples with P as doping element (upper panel of FIG. 6B and FIG. 6A) with a Ca/Si molar ratio of 2, P/Si molar ratio of 0.35, at 250° C. and 225° C. and 200° C. according to Example 2(b).
Figure 6B:
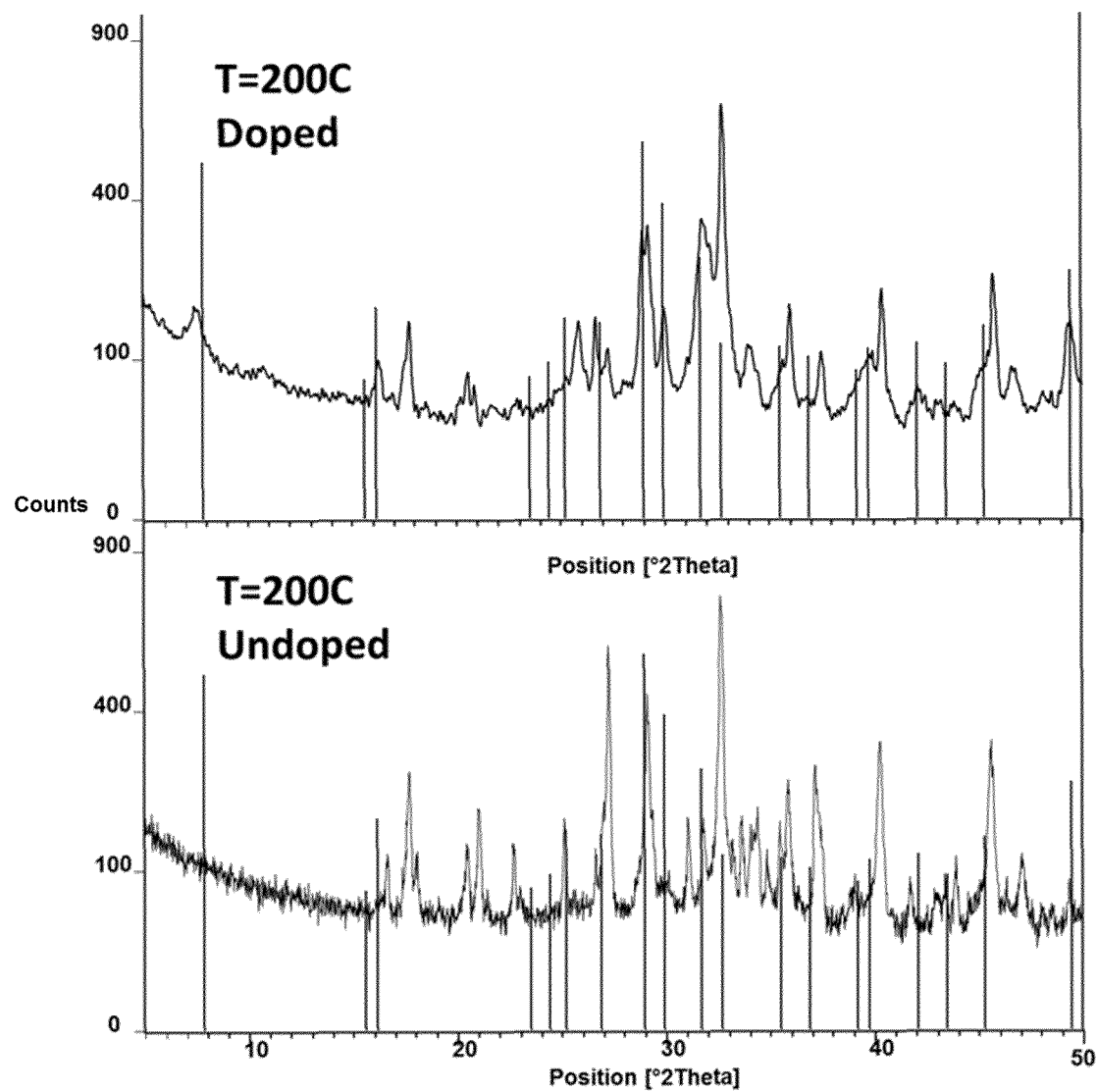

The XRD pattern of the products resulting from the mentioned hydrothermal treatments are presented in FIG. 6 correspond to the products resulting from hydrothermal temperatures of 200° C., (undoped and doped) 225° C. (doped) and 250° C. (doped) respectively.

As can be seen, even at 200° C. the undoped formulations does not give any signal at 2Theta=7.8° while the signal is clearly present for the formulations doped. This peak is also clearly visible at higher temperatures (225° C. and 250° C.), something that confirms the relevance of the doping element for stabilizing tobermorite-like structures at high temperatures.

Example 3

Effect of Ca/Si Ratios

To cover the typical Ca/Si molar ratio found in cementitious C-(A)-S-H gel (typically ranging between 1.5 and 2.5), three Ca/Si molar ratios have been studied; namely Ca/Si=1.6, Ca/Si=2, Ca/Si=2.2.

Besides, the samples with Ca/Si=1.6 and Ca/Si=2.2 molar ratios, were doped with Borax in an amount so that the molar ratio B/Si=0.172.

The batch of Fly Ashes and acetylene lime slurry suspension was the same employed in Example 1. For the undoped formulation the starting material corresponded to 107 g of FA and 314 g of acetylene lime slurry (Ca/Si=2.2), 107 g of FA and 254 g of acetylene lime slurry (Ca/Si=1.6).

For the doped formulations the starting materials comprised 91 g of FA and 190 g of the acetylene lime slurry for the Ca/Si=1.6 case and 91 g of FA and 267 g of the acetylene lime slurry suspension for the Ca/Si=2.2 case. In both cases the starting materials were mixed with 12.73 g of Borax so as to give a molar ratio B/Si=0.172. In all cases water was added taking into account the amount already present in the suspension until reaching 1 liter in total.

Afterwards all formulations were subjected to the same hydrothermal treatment at 200° C., during 4 h, with endogenous pressure and stirring. Resulting slurry was further processed to obtain a powder as defined above.

Figure 7:
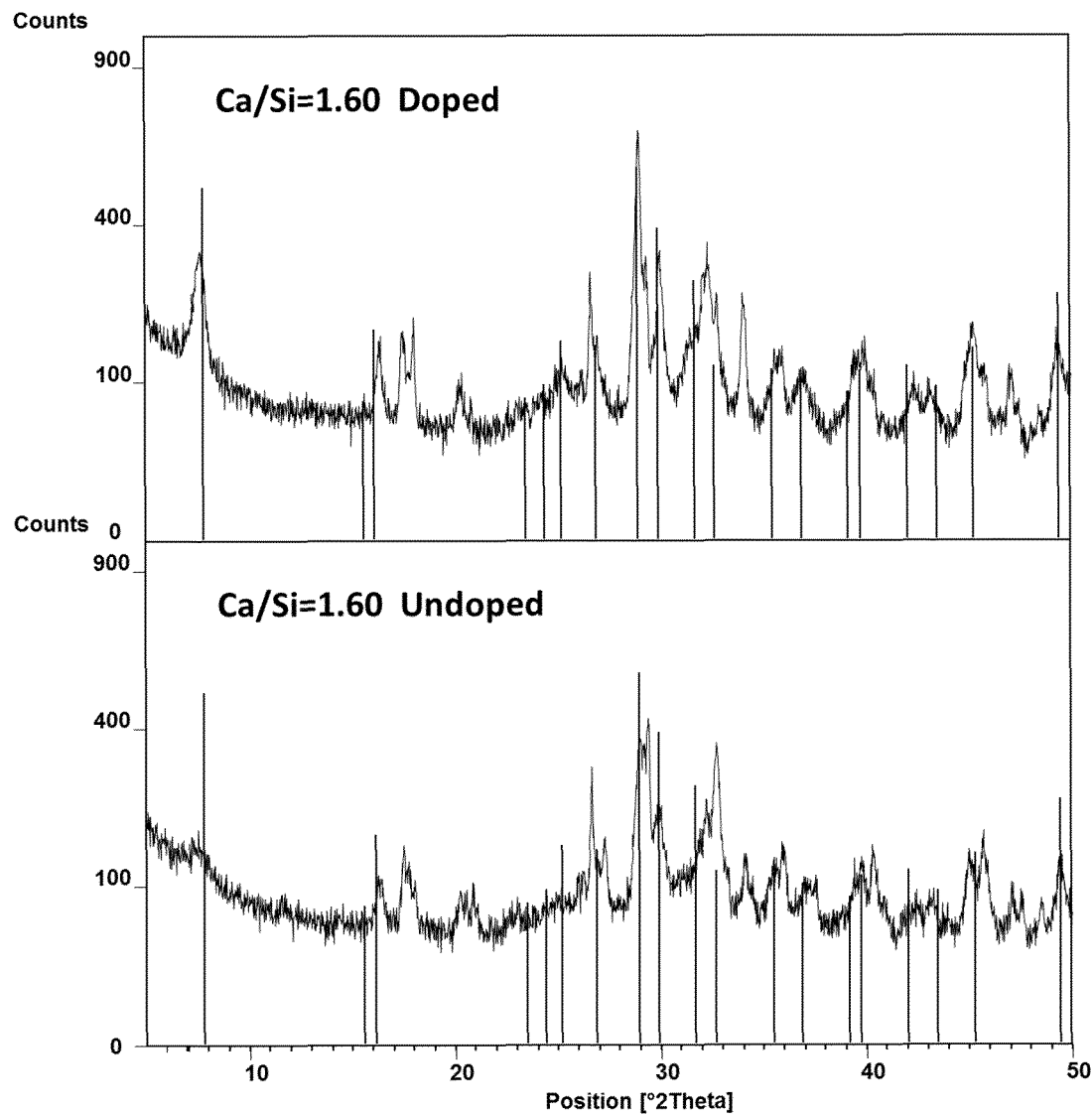
FIG. 7: shows the XRD pattern of the products resulting from a hydrothermal treatment of an undoped sample (bottom panel) and a doped sample with B as doping element (upper panel), with a Ca/Si molar ratio of 1.60, B/Si molar ratio of 1.172, at 200° C. obtained according to Example 3.

The XRD pattern of the products for the undoped and doped samples with Ca/Si=2.2 and Ca/Si=1.6 are shown in FIG. 1 and FIG. 7. As can be seen in FIG. 7, at the lowest C/S ratio (C/S=1.6) the undoped sample present a small bump at about 7°-8°, suggesting the presence of an ill-defined tobermorite domain. This results was expected since even at this low C/S ratio, the formation of tobermorite-like structures is troublesome at temperatures beyond 120° C.-140° C. The addition of a minor content of B (upper panel) stabilizes the crystalline structure of tobermorite and the signal of the basal peak is largely enhanced. The case of C/S=2.2 and T=200 (FIG. 1) is a worse scenario for the appearance of tobermorite-like domains when no doping agent is present. In fact no tobermorite-like domain is noticed in the XRD pattern of the undoped sample (FIG. 1 bottom). In contrast, as discussed before, the presence of minor amounts of B is capable of stabilizing the tobermorite phase at high temperatures, as it is reflected in FIG. 1 top—as the appearance of the peak around 7.8°—is a clear hallmark of tobermorite-like domains.

Example 4

Effect of Different Starting Materials

Two samples both with Ca/Si=2 were prepared and compared by XRD, one with doping agent, one without doping agent. The same batch of grounded glass and lime was employed in both cases. The chemical composition of the grounded glass as determined by Fluorescence (FRX) is shown in Table 2.

TABLE 2

| | LOI | SiO$_2$ | Al$_2$O$_3$ | Fe$_2$O$_3$ | MgO | K$_2$O | Na$_2$O | CaO | SO$_3$ |
|---|---|---|---|---|---|---|---|---|---|
| % FRX | 0.28 | 70.49 | 1.83 | 0.53 | 2.53 | 0.81 | 12.06 | 9.78 | 0.05 |

LOI = Loss on ignition

For the undoped formulation the starting material corresponded to 67.63 g of grounded glass and 82.37 g lime.

For the doped formulation the starting materials comprised 67.63 g of grounded glass, 82.37 g of lime mixed and 20.06 g of P$_2$O$_5$ (i.e. Ca/Si=2; P/Si=0.35). In both cases 1 liter of water was added.

Afterwards both formulations were subjected to the same standard treatment (with 200° C. in the autoclave).

Figure 8:
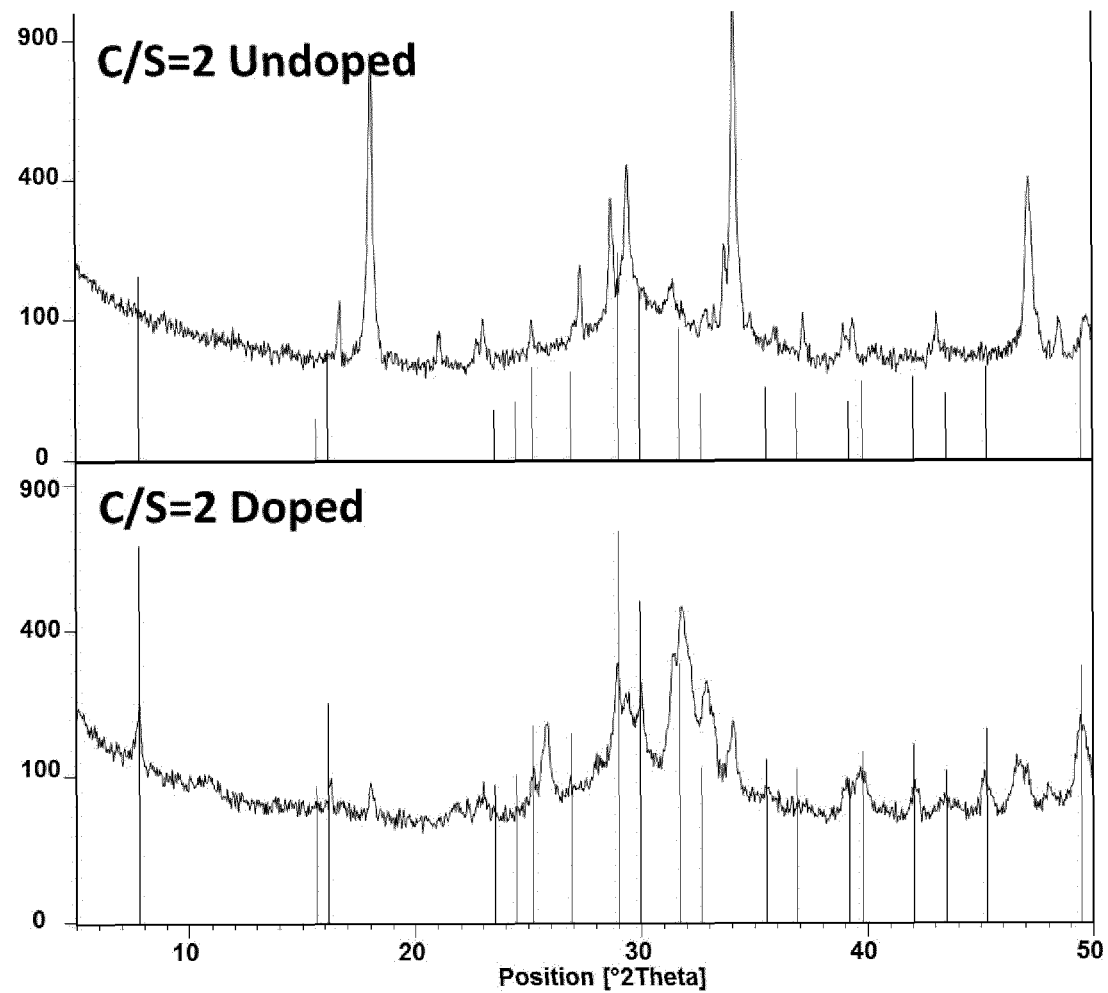
FIG. 8: shows the XRD pattern of the products resulting from a hydrothermal treatment of an undoped sample (bottom panel) and a doped sample with P as doping element (upper panel), with a Ca/Si molar ratio of 2, P/Si molar ratio of 0.35, at 200° C. obtained according to Example 4.

The XRD pattern of the product resulting from the mentioned hydrothermal treatment gives a signal at 2Theta=7.8° (FIG. 8). This peak is the so-called basal peak, and is a clear hallmark for the presence of tobermorite-like crystallites. Since the Al content in the starting materials is very low, the resulting product contains basically C-S-H in the form of defective tobermorite (no Al substitutions in the C-S-H structure). Other important tobermorite peaks like those at 17°, 29°, 31° and 50° are likewise shown by arrows and confirm the pivotal role of the doping element in their appearance.

Example 5

This example illustrates the importance of the doping agent on the seeding capacity of the resulting product, and how this affects the early mechanical properties of a cement based material being a cement paste.

To this end, five varieties of cement pastes were prepared in the same way. They were obtained from 52.5-R cements with a water to cement ratio of 0.35 and with additions of a 6% by weight of the powder obtained according to the invention.

The only difference between the cement pastes was the synthetic route employed to produce the powder used, as one did not include any doping agent during its production, whereas the second one did include a doping agent.

The used doped and undoped powders were those made according to Examples 1(a) and 3. One set of samples without powder containing nucleating agents was additionally prepared for comparison. After mixing, the cement pastes were cast into prism-shaped molds (1 cm×1 cm×6 cm), compacted by vibration and stored for one day in a climatic chamber at a temperature of 21±2° C. and >90% humidity. Afterwards they were demolded and kept for one day more in a saturated dissolution of Ca(OH)$_2$. Later the compressive strengths of the samples were measured using a Tester Ibertest Press. In Table 3 the early compressive strength of the four cement pastes are compared. As it can be seen from Table 3, the use of doping elements in the process of the invention for the preparation of a powder containing nucleating agents, noticeably improves the seeding capacity of the powder of the invention.

TABLE 3

| Comparative examples | |
|---|---|
| Effect of doping agent | Compressive Strength (MPa)-1 day |
| Reference | 28,62 (±2) MPa |
| powder produced without doping agents ([CaO]/[SiO$_2$] = 2.2 and B/Si = 0 | 29.41 (±3) MPa |
| powder produced without doping agents ([CaO]/[SiO$_2$] = 1.6 and B/Si = 0 | 30.16 (±2) MPa |
| powder produced with doping agent ([CaO]/[SiO$_2$] = 2.2 and B/Si = 0.172) | 32.27 (±2) MPa |
| powder produced with doping agent ([CaO]/[SiO$_2$] = 1.6 and B/Si = 0.172) | 36.42 (±2) MPa |

Example 6

Comparative Example

Use of the Powder of the Invention as Hardener in Comparison to Other Commonly Employed SCMs The FIG. 9 shows the increase in the compressive strength (with respect to the plain cement paste of reference) for cement pastes made with water-to-cement ratio of w/c=0.35 and 2% by weight of additions and cured for 7 days. The cement corresponded to a 52.5-R Ordinary Portland Cement while the additions corresponded to nanosilica particles (NS), nanoalumina particles (NA), Silica Fume or microsilica (MS), and the powder containing C-H-S in the form of defective tobermorite of the invention (obtained according to Example 1 a).

After mixing, the cement pastes were cast into prism-shaped molds (1 cm×1 cm×6 cm), compacted by vibration and stored in a climatic chamber for 1 day at a temperature of 21±2° C. and >90% humidity. After, the samples were demolded and stored for 7 days in a saturated dissolution of Ca(OH)$_2$. Afterwards the compressive strengths of the samples were measured using a Tester Ibertest Press. As it can be seen from FIG. 9, the addition of the product containing C-(A)-S-H in the form of defective tobermorite of the invention entails to achieve cement pastes with compressive properties as good as those shown with NS particles, slightly better than those with NA additions and largely better than those with MS additions.

Example 7

This example illustrates the characterization of the product obtained by the process of the invention.

Rietveld Quantitative Phase Analysis (RQPA) has been employed to quantify the amount of each crystalline phase along with the percentage of amorphous material present in the products obtained by the process of the invention as illustrated in the examples above. To this end the samples were mixed in known proportions with standardized quartz samples and the refinement implemented in the PANalytical HigScore Plus (HSP) software package. The amorphous content has been determined following the procedure addressed in Suherland et al, *Powder Diffraction*, 2002, vol. 17, p. 178. The phases with contents lower than 1% are troublesome for accurate determination, so they should be considered as traces.

As illustrative cases, Table 4 shows the RQPA of the undoped product obtained in Example 1(a) (Ca/Si=2.2), the P-doped product obtained in Example 2 (Ca/Si=2; P/Si=0.35) and the B-doped product obtained in Example 1(b) (Ca/Si=2.2; B/Si=0.172).

TABLE 4

RQPA analysis of the products obtained by the process of the invention

| Phase | Undoped (Ca/Si = 2.2) | P-doped (Ca/Si = 2, P/Si = 0.35) | B-doped (Ca/Si = 2.2, B/Si = 0.172) |
|---|---|---|---|
| Calcite | 2.4 ± 0.3 | 0.5* | 2.4 ± 0.3 |
| α-Dicalcium silicate hydrate (C$_2$HS) | 21.1 ± 0.6 | | |
| Portlandite | 0.4* | 0.5* | 4.4 ± 0.4 |
| Katoite | 52.1 ± 0.9 | 24.2 ± 0.9 | 37.5 ± 0.9 |
| Quartz | | 2.1 ± 0.4 | |
| Tobermorite | | 12.6 ± 0.6 | 27.2 ± 0.9 |
| Hydroxyapatite | | 28.5 ± 0.7 | |
| Grattarolaite | | 1.7 ± 0.6 | 1.9 ± 0.5 |
| Periclase | | | 0.7* |
| Amorphous | 23.9 ± 0.9 | 29.8 ± 0.9 | 25.8 ± 0.9 |

It may be observed that only the products obtained when using doping agents contain C-(A)-S-H in the form of defective tobermorite, which is the phase providing high seeding capacity. Additionally, the product obtained by using P as doping agent contains hydroxyapatite. This phase also provides a high seeding capacity and is thus also a good nucleating agent. The undoped product does not contain any of these phases (tobermorite-like C-(A)-S-H or hydroxyapatite). Instead, the undoped product contains α-Dicalcium silicate hydrate (C$_2$HS), which has a much lower seeding capacity.

The C-(A)-S-H tobermorite-like phase contained in the above products was further characterised in order to define its structure in comparison to cementitious C-(A)-S-H gel.

Much of the existing knowledge on the nanostructure of cementitious C-(A)-S-H gel has been gained from structural comparisons with crystalline calcium silicate hydrates. In fact, several models have been proposed so far that draw structural analogies with tobermorite. From these models, C-(A)-S-H gels can be approximately viewed as layered structures, in which calcium oxide sheets are ribbed on either side with silicate chains, and free calcium ions and water molecules are present in the interlayer space.

Figure 10:
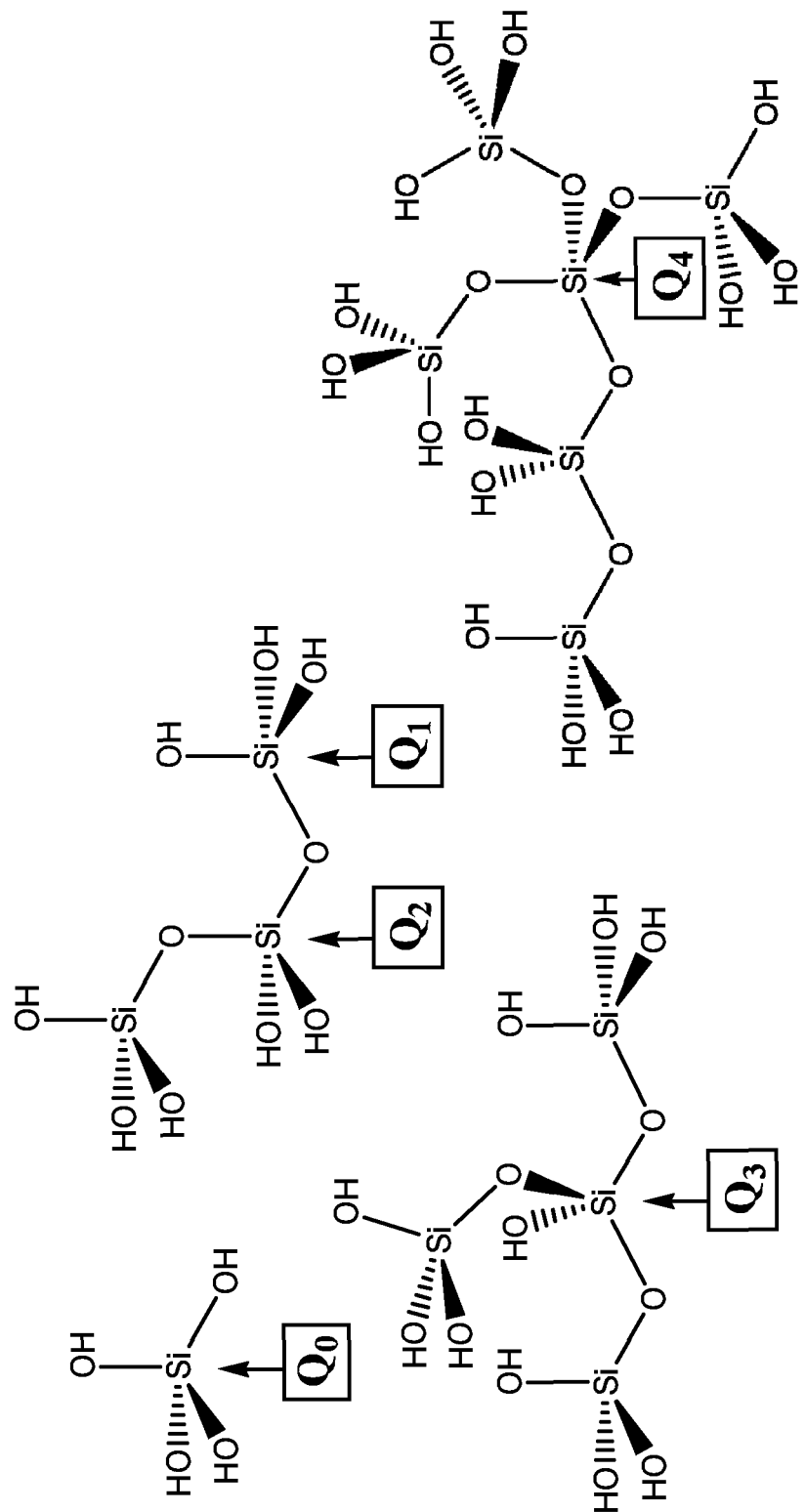
FIG. 10: shows tobermorite structure

However, it is experimentally well established that, if the structure of the C-(A)-S-H gel is actually composed of tobermorite pieces, these components should show multiple defects and imperfections. In fact, C-(A)-S-H gel can be viewed as a defected tobermite formed by the omission of bridging tetrahedrons, by the omission of entire segments of silicate chains, or by the inclusion of tiny Ca(OH)$_2$ environments. In the 29Si NMR experiments a Qn nomenclature is used in general for the peaks. Qn is the chemical shift of a silicon atom that is bound to n bridging oxygens. Therefore the defected tobermorite pieces of C-S-H gel can be explained in terms of the appearance of Q1 sites. The Q1 sites are ending sites (see FIG. 10) and therefore are a fingerprint of finite silicate chain lengths. In general, the Mean Chain Length (MCL) of the silicate chains can be evaluated with the formula MCL=2 (Q1+Q2+Q3)/Q1. A perfect Tobermorite crystal would have an infinite MCL, as it only has Q2 and Q3 sites.

Table 5 shows the MCL of the tobermorite phase contained in the P-doped and the B-doped products of table 4. For comparison, the MCL of a perfect and a synthesized tobermorite (synthetic Tobermorite) is also included in the table.

TABLE 5

MCL of C-(A)-S-H tobermorite obatined by the process of the invention.

| | Perfect Tobermorite | cementitious C-(A)-S-H gel | P-doped (Ca/Si = 2, P/Si = 0.35) | B-doped (Ca/Si = 2.2, B/Si = 0.172) |
|---|---|---|---|---|
| MCL | infinity | 2-14[1] | 11.06 | 8.21 |

[1]F. Puertas et al. *Journal of the European Ceramic Society*, 2011, vol. 31, p. 2043

It may be observed that, in comparison to a perfect tobermorite and also to tobermorite-like structures contained in cementitious C-(A)-S-H gels, the tobermorite contained in the above products has a high structural similarity to cementious C-(A)-S-H. The present inventions believe that the present process thus yields C-(A)-S-H in the form of defective tobermorite that is similar to cementious C-(A)-S-H gel. This similarity is the reason why the obtained product shows a particularly high seeding capacity, greatly exceeding the seeding capacity of synthetic tobermorite. The products obtained by the present method may thus be seen as containing C-(A)-S-H in the form of defective tobermorite useful as hardening accelerator or seeding additive for concrete or other cement based materials.

REFERENCES CITED IN THE APPLICATION

S. Chandra and H. Bergqvist, *Proc. Int. Congr. Chem. Cem.* 1997, vol. 3, 3ii106, 6 pp
Thomas et. al., *J. Phys. Chem. C* 2009, vol. 113, p. 4327-4334
Hubler et al., *Cement and Concrete Research* 2011, vol. 41, p. 842-846
Baltakys et al, *Materials Science—Poland* 2009, vol. 27, No. 4/1
WO2010/026155
WO2014/183846
Guerrero et. al., *J. Am. Ceram. Soc.* 2005, vol. 88, p. 1845-1853
Suherland et al, *Powder Diffraction*, 2002, vol. 17, p. 178.
F. Puertas et al. *Journal of the European Ceramic Society*, 2011, vol. 31, p. 2043

The invention claimed is:

1. A process for the manufacturing of a slurry containing nucleating agents which comprises reacting at least one source of a Ca containing compound with at least one source of a Si containing compound, in an aqueous media and in the presence of a doping agent selected from the group consisting of a compound containing P, a compound containing B, and mixtures thereof; wherein:
   (i) the reaction is a hydrothermal reaction carried out at a temperature from 140 to 250° C. and endogenous pressure;
   (ii) the total molar ratio of Ca to Si is from 1.8 to 2.4, and
   (iii) the total molar ratio of doping agent to Si is from 0.01 to 2; provided that:

(a) when the sole doping agent is a compound containing P, the total molar ratio of P to Si is from 0.1 to 2; and (b) when the sole doping agent is a compound containing B, the total molar ratio of B to Si is from 0.01 to 2, wherein the nucleating agents comprise Calcium Silicate Hydrate (C-S-H) in the form of defective tobermorite.

2. The process according to claim 1 that additionally comprises reacting at least one source of an Al containing compound and the nucleating agents comprise Calcium (Aluminium) Silicate Hydrate (C-(A)-S-H) in the form of defective tobermorite.

3. The process according to claim 1, wherein the compound containing P is $P_2O_5$.

4. The process according to claim 3, wherein the nucleating agents additionally comprise hydroxyapatite.

5. The process according to claim 1, wherein the compound containing B is borax.

6. The process according to claim 1, wherein the calcium containing compound is selected from calcium oxide, calcium hydroxide, and mixtures thereof.

7. The process according to claim 1, wherein the silicon containing compound is a water-soluble silicate compound.

8. The process according to claim 2, wherein the aluminium containing compound is a water soluble aluminate.

9. The process according to claim 1, wherein the source of the calcium containing compound and the source of the silicon containing compound are industrial wastes or by-products.

10. The process according to claim 9, wherein the source of the calcium containing compound is acetylene lime slurry.

11. The process according to claim 9, wherein the source of the silicon containing compound is selected from fly ash, silica fume, ground granulated blast furnace slag, salt slag, glass and mixtures thereof.

12. The process according to claim 1, wherein the solid to water ratio by weight is comprised from 0.2 to 100.

13. The process according to claim 1, wherein the duration of the reaction is comprised from 2 to 8 hours.

14. A process for the manufacturing of a powder containing nucleating agents which comprises:
a) carrying out the process as defined in claim 1,
b) filtering the resulting slurry,
c) drying the resulting filtered product at a temperature comprised from 80 to 150° C., and
d) disagglomering the resulting dried product to obtain a powder.

15. A slurry containing nucleating agents obtainable by the process of claim 1.

16. A powder containing nucleating agents obtainable by the process of claim 14.

17. The powder according to claim 16, that comprises from 5 to 70% by weight of C-S-H in the form of defective tobermorite or from 1 to 30% by weight of C-S-H in the form of defective tobermorite.

18. Additive composition for concrete or other cement based materials comprising the powder according to claim 16, together with appropriate additives.

19. Use of the slurry according to claim 15 as hardening accelerator for concrete or other cement based materials.

20. Concrete or other cement based material made with the slurry according to claim 15.

21. The process according to claim 2, wherein the source of the calcium containing compound, the source of the silicon containing compound, and the source of the aluminium containing compound are industrial wastes or by-products.

22. The process according to claim 2, wherein the source of the calcium containing compound, the source of the silicon containing compound, and the source of the aluminium containing compound are selected from fly ash, silica fume, ground granulated blast furnace slag, salt slag, glass and mixtures thereof.

* * * * *